(12) United States Patent
Dowling

(10) Patent No.: US 7,146,489 B2
(45) Date of Patent: Dec. 5, 2006

(54) METHODS FOR INTELLIGENT CACHING IN AN EMBEDDED DRAM-DSP ARCHITECTURE

(75) Inventor: Eric M. Dowling, Richardson, TX (US)

(73) Assignee: Micron Technology, Inc., Boise, ID (US)

(*) Notice: Subject to any disclaimer, the term of this patent is extended or adjusted under 35 U.S.C. 154(b) by 507 days.

(21) Appl. No.: 10/074,705

(22) Filed: Feb. 13, 2002

(65) Prior Publication Data

US 2002/0087845 A1 Jul. 4, 2002

Related U.S. Application Data

(62) Division of application No. 10/001,007, filed on Nov. 14, 2001.

(51) Int. Cl.
*G06F 15/00* (2006.01)
*G06F 9/30* (2006.01)
*G06F 9/40* (2006.01)

(52) U.S. Cl. .......................... 712/207; 712/1

(58) Field of Classification Search ............ 712/5, 712/207, 224, 225, 228, 235, 237, 1
See application file for complete search history.

(56) References Cited

U.S. PATENT DOCUMENTS

| | | | |
|---|---|---|---|
| 4,725,945 A | 2/1988 | Kronstadt | |
| 4,881,168 A | 11/1989 | Inagami et al. | |
| 5,203,002 A | 4/1993 | Wetzel | |
| 5,237,702 A * | 8/1993 | Hayashi et al. | 712/7 |
| 5,239,639 A | 8/1993 | Fischer et al. | |
| 5,321,425 A * | 6/1994 | Chia et al. | 345/569 |
| 5,345,560 A * | 9/1994 | Miura et al. | 711/3 |
| 5,357,617 A | 10/1994 | Davis et al. | |
| 5,423,048 A * | 6/1995 | Jager | 712/207 |
| 5,428,754 A | 6/1995 | Baldwin | |
| 5,440,711 A | 8/1995 | Sugimoto | |
| 5,450,556 A | 9/1995 | Slavenburg et al. | |
| 5,479,635 A | 12/1995 | Kametani | |
| 5,530,817 A | 6/1996 | Masubuchi | |
| 5,530,944 A | 6/1996 | Stones | |
| 5,574,939 A | 11/1996 | Keckler et al. | |
| 5,613,078 A | 3/1997 | Kishigami | |

(Continued)

OTHER PUBLICATIONS

Hennessy and Patterson, "Computer Architecture—A Quantitative Approach, 2nd Edition," 1996, pp. 278-280, 428-429.*

(Continued)

*Primary Examiner*—Eddie Chan
*Assistant Examiner*—David J. Huisman
(74) *Attorney, Agent, or Firm*—Gazdzinski & Associates

(57) ABSTRACT

An efficient embedded-DRAM processor architecture and associated methods. In one exemplary embodiment, the architecture includes a DRAM array, a set of register files, set of functional units, and a data assembly unit. The data assembly unit includes a set of row-address registers and is responsive to commands to activate and deactivate DRAM rows and to control the movement of data throughout the system. A pipelined data assembly approach allowing the functional units to perform register-to-register operations, and allowing the data assembly unit to perform all load/store operations using wide data busses. Data masking and switching hardware allows individual data words or groups of words to be transferred between the registers and memory. Other aspects of the invention include a memory and logic structure and an associated method to extract data blocks from memory to accelerate, for example, operations related to image compression and decompression.

94 Claims, 6 Drawing Sheets

U.S. PATENT DOCUMENTS

| | | |
|---|---|---|
| 5,615,355 A | 3/1997 | Wagner |
| 5,627,982 A | 5/1997 | Hirata et al. |
| 5,636,367 A | 6/1997 | Stones et al. |
| 5,649,232 A | 7/1997 | Bourekas et al. |
| 5,655,133 A | 8/1997 | Dupree et al. |
| 5,664,215 A | 9/1997 | Burgess et al. |
| 5,694,565 A | 12/1997 | Kahle et al. |
| 5,848,284 A | 12/1998 | Sharangpani |
| 5,896,523 A * | 4/1999 | Bissett et al. ............... 713/400 |
| 5,933,627 A | 8/1999 | Parady |
| 5,996,066 A | 11/1999 | Yung |

OTHER PUBLICATIONS

Patterson, David, et al., "A Case for Intelligent RAM: IRAM," Computer Science Division/EECS Dept., University of California, (Feb. 10, 1997) pp. 1-23.

* cited by examiner

METHODS FOR INTELLIGENT CACHING IN AN EMBEDDED DRAM-DSP ARCHITECTURE

REFERENCE TO RELATED APPLICATIONS

This application is a divisional of U.S. patent application Ser. No. 10/001,007 filed Nov. 14, 2001, entitled "Embedded-DRAM-DSP Architecture," which claims priority benefit of U.S. patent application Ser. No. 09/021,933 filed Feb. 11, 1998 of the same title, which claims priority benefit of U.S. provisional application Ser. No. 60/054,439 filed Aug. 1, 1997 of the same title.

BACKGROUND OF THE INVENTION

1. Field of the Invention

This invention relates to the field of microsystems architectures. More particularly, the invention relates to memory access, memory hierarchy and memory control strategies targeted for use in embedded-DRAM (dynamic random access memory) digital signal processors (DSPs) and media processors.

2. Description of the Related Art

Digital signal processors (DSPs) are microprocessors optimized to execute multiply-accumulate intensive code on arrays of data. Media processors are similar to DSPs, but are further optimized for packed-pixel vector processing and to function in PC and workstation environments. Typical DSP and media processor applications include modems, tone processing for telecommunication applications, cellular communications processing, video compression/decompression, audio processing, computer vision, biomedical signal analysis, and the like. Many of these applications involve the processing of large data arrays that are stored in memory. High-speed on-chip SRAM (static random access memory) is provided on most prior art DSPs in order to allow them to access data rapidly. In many systems, external memory is needed, and such memory has traditionally been implemented with costly SRAM in order keep the DSP from inserting large numbers of wait states while accessing external memory. Larger but slower DRAMs are employed when a very large external memory is needed since fast SRAMs of the same size would be prohibitively expensive in most applications. The use of a slower external DRAM often becomes the bottleneck that limits system performance in memory-intensive processing applications such as video compression and decompression. Some prior art DSPs provide DRAM interfaces and use DMA (direct memory access) controllers to move data back and forth between the DRAM and a large on-chip SRAM. Large on-chip program memories or caches are provided to keep the processor from having to execute instructions out of the much slower external DRAM. Hence, current processor architectures need large amounts of on-chip SRAM to keep the memory system from creating a bottleneck and slowing down the processor.

A problem with the prior art is that SRAM takes on the order of 35 times more silicon area than DRAM for the same number of memory cells. Also, applications such as video processing involve large data arrays that need to be constantly moved on and off-chip. When the program does not all fit in program memory or when an instruction cache miss occurs, the program flow is slowed while waiting for instructions to be fetched from the slower off-chip DRAM. This problem is exacerbated in VLIW (very long instruction word) architectures where the difference in access times between an instruction cache hit and a miss can be an order of magnitude. Also, when the data arrays to be manipulated do not fit on chip, extra data movement and less than optimal systems implementations are required to partition the problem. For example, in video decompression, a coded video bit stream moves from the CD ROM into DRAM, and then a separate DMA channel is set up to constantly move segments of the bit stream on chip and to export results off chip in order to keep enough working memory space available. This piecemeal approach requires extra overhead and system bus bandwidth. Possibly more importantly, this piecemeal approach complicates programming, often leading to assembly coded implementations that increase the time-to-market and increase the development and maintenance costs of the system.

Some newer prior art systems integrate DRAM onto the same chip as the processor. A notable example is the Siemens Tricore processor. This processor includes wide data paths to memory and various architectural innovations, but otherwise uses traditional instruction and data caching structures. The traditional caching approach incorporates a large hierarchical caching structure with one or more levels. By storing the most recently used data and instructions in the faster cache levels, the processor is able to perform data transactions, on average, much more rapidly than if it had to interact directly with the DRAM. Typically, a set-associative or a direct mapped caching policy with a least recently used eviction strategy is employed. Traditional caching techniques assume the programmer knows nothing of the memory hierarchy, and such techniques allow the operating system and hardware level caching algorithms to perform paging and line-filling at the various memory hierarchy levels for the programmer.

While prior art memory hierarchy concepts serve well in processors, such concepts may not be the best approaches for embedded-DRAM processor architectures. First of all, large SRAM caches take up a significant amount of silicon area, largely defeating the purpose of integrating DRAM on to the processor. When the processor executes image and signal processing algorithms, data caches become much less useful because image and signal data structures do not typically fit in the cache. In fact, overall performance will often be degraded due to overhead associated with ineffective caching. To alleviate this problem, a traditional solution would be to integrate both DRAM and large SRAM memory banks on chip and to use a DMA controller to shuffle data back and forth between the on-chip DRAM and SRAM banks. A data cache may also be used to cache recently used data. This type of solution is implemented on the Siemens Tricore chip and represents an on-chip extension of the prior art technology.

A problem that exists in prior art systems, especially DSPs and media processors, is the difficulty for compilers to efficiently translate a high-level language program into an efficient implementation. The difficulty arises largely due to the complicated pointer manipulations and indexing needed to keep the pipelines of the architecture running near their peak efficiency. When data caches are also included, the problem can be even more severe. For example, it is known that on some architectures a matrix multiply program can be sped up by almost an order of magnitude just by reorganizing the loop structures to operate on smaller sub-matrices that can be reused out of a cache. Thus, a problem with prior art DSPs and processors that employ data caching structures is the difficulty compilers have in generating efficient code due to their need to design very complicated pointer manipulation strategies and the need to account for second order cache side-effects.

From a silicon area standpoint, it would be desirable to have an architecture that employs as much very dense DRAM as possible and as little high speed SRAM as possible. From a performance standpoint, it would be desirable to have an architecture that incurs minimum delay while accessing a slower but larger DRAM. It would also be desirable to have an architecture that could efficiently extract data objects out of large data structures stored in the DRAM. It would also be desirable to include DRAM array control oriented registers and instructions into the architecture so the programmer or compiler could efficiently manipulate the DRAM resources. It would be desirable to have an architecture that could be efficiently exercised by programs translated from high level languages by compilers. This would reduce an application's time-to-market while also reducing development costs. It would also be desirable to be able to respond quickly to interrupts by avoiding large delays associated with switching the machine context into and out of slower DRAM. It would also be desirable to include a register windowing system to allow local variables and register spaces to be quickly loaded and stored to accelerate function calling. It would also be desirable to minimize or eliminate the need for an instruction cache, allowing the program to efficiently execute out of DRAM, with a very minimal cache whose small size does not produce a performance penalty.

SUMMARY OF THE INVENTION

The present invention solves these and other problems by providing an embedded-DRAM processor architecture with a program-controlled data transfer and caching structure that reduces or eliminates waiting time due to DRAM accessing. The present invention achieves this without the need for large SRAM caches as was required in prior art systems. The present invention incorporates an intelligent memory controller which performs prefetching and look-ahead operations to optimize the use of wide on-chip data paths available to the DRAM arrays. The present architecture is hardware efficient and involves parallel operations to accelerate the execution of standard programs. The present architecture is useful for reducing DRAM related delays in a wide variety of processor types, especially superscalar and VLIW processors with multiple pipelines.

A further aspect of the present invention is a DRAM array structure coupled by wide data paths to a set of SRAM register files. Another aspect of the present invention is a memory controller unit operative to execute instructions in parallel with the processor's core functional units, and to control the flow of data between the DRAM array structure and the SRAM register files. While the core functional units operate on data stored in an active register file, the memory controller moves data between an inactive register file and the DRAM array structure. In a method of processing, the core functional units and the memory controller execute a single instruction stream together as distinct functional unit groupings. At specified times, the memory controller may fork a thread, and when an inactive register file is ready to be switched to an active state, the memory controller resynchronizes with the core functional units using shared flag bits.

A still further aspect of the invention is a DRAM array area designated for single-cycle task switching. In this aspect of the invention, only the primary register set needs to be saved. When an interrupt is detected, the memory controller optionally saves the register contents of the inactive register set and then saves the active register set. When the save is made, the program counter, the status register, and other volatile state registers are saved to a DRAM bank whose length matches the total amount of nonvolatile information that needs to be saved in a task switch. Another aspect of the invention is a method for calling subroutines in an embedded-DRAM processor architecture. In this method, the active register set is automatically saved into a DRAM array stack area, and a stack frame of local variables is created in a secondary register set.

A further aspect of the invention involves a DRAM bank organization together with hardware and algorithmic support structures. The structure supports a method to extract data objects out of a larger data object stored in a DRAM array. For example, a large decompressed image may be stored in the DRAM. A structure to store the image in the DRAM is provided together with a method to extract, for example, 8×8 blocks out of the image.

A further aspect of the present invention is an instruction fetching mechanism that supports full-speed execution during sequential accesses. This mechanism also allows branch instructions to be cached. With the branch cache, when a branch cache-hit occurs, the pipeline stages that would otherwise stall proceed at full speed by fetching a short sequence of instructions from the branch cache. Meanwhile, during sequential accesses, the instructions may be fetched from an interleaved set of DRAM banks. This reduces the size of the SRAM program cache needed to keep standard, superscalar and VLIW architectures fetching instructions at full speed.

A further aspect of the present invention is an architecture and programming model suitable to be efficiently programmed in a high level language. An intelligent caching structure is introduced whereby a cache controller operates with specific knowledge of the executing program. With the inventive structure, instead of the cache operating with a cache-hit or cache-miss policy, the cache controller performs look-ahead and speculative fetching operations for the functional units which only operate on architectural register files. The intelligent cache controller, called a data assembly unit, assembles data packets in register files. When the data is assembled in the register file, it is switched from an inactive to an active state where it functions as an architectural register set. The architectural registers are the registers visible to the program executed by functional units in the architecture. By using wide data paths, look-ahead policies, speculative precharging and prefetching, and data rearrangement, the data structures presented to the functional units are simple and consistent and do not require complicated pointer manipulations and indexing schemes. Also, since the data assembly unit prepares the data into a limited set of SRAM register files, program inefficiencies due to data structures not fitting into cache are reduced or eliminated.

Another aspect of the present invention is an embedded-DRAM processor comprising a plurality of DRAM banks. Each DRAM bank comprises a plurality of DRAM arrays, and each DRAM array comprises a plurality of random access memory cells arranged in rows and columns. Row control circuitry selects, in response to a row address, a set of rows of cells for access. The set of rows make up a row of data words in one of the DRAM banks. A plurality of register files have a parallel access port operative to transfer data into or out of a plurality of registers in response to a single program-controlled latch signal. The register files also have a plurality of individual register ports whereby selected individual registers may be accessed under program control. A mask and switch unit couples at least a subset of columns of the row of cells to the parallel access input of at least two of the register files. A set of functional units is coupled to the register files. The functional units access selected registers in the register files in response to instructions. Register file control circuitry responds to a register file select signal to select a register file whose registers may be accessed by instructions executed on the functional units.

Another aspect of the present invention is an embedded-DRAM processor which comprises a plurality of DRAM arrays. Each of the DRAM arrays comprises a plurality of random access memory cells arranged in rows and columns. A data assembly unit comprises a set of row registers. Each row register is capable of holding a row address. The data assembly unit is responsive to program instructions to select at least one of the rows and to selectively provide one of a read signal and a write signal to a selected one of the DRAM arrays. Each of first and second register files comprises a set of registers, a parallel access port for loading or storing one of the entire register files in a single cycle, and a plurality of individual register ports to allow individually controlled accesses to individual registers. A mask and switch unit is operative to couple the selected rows to a parallel access port of the first register file. A set of functional units is selectively coupled under program control to one of the first register file and the second register file. When the second register file is selectively coupled to the functional units, the selected rows may be transferred in a single cycle to or from the first register file via the parallel access port, and, at the same time, at least some of the registers in the second register file are accessible individually by the set of functional units. Preferably, the selected row comprises a row of words, wherein a word contains the number of bits used in each register. Also preferably, the mask and switch unit is responsive to a set of program-controlled mask bits which select or deselect bit fields of the selected row to allow a subset of the registers in the first register filer to be loaded or stored in the single cycle. Preferably, the mask and switch unit is responsive to a set of program-controlled permutation bits. The permutation bits are indicative of a permutation pattern used to rearrange the relative positions of data bits as they pass through the mask and switch unit. For example, the permutation bits indicate a left-barrel-shift permutation, a right-barrel-shift permutation or a rotate permutation. Preferably, the data assembly unit further comprises an instruction register coupled to receive instructions fetched by a first prefetch unit which fetches instructions for the functional units. Also preferably, the data assembly unit further comprises an instruction register coupled to receive instructions fetched by a second prefetch unit which fetches instructions for the data assembly unit from a local store.

Another aspect of the present invention is an embedded-DRAM processor which comprises a DRAM array which comprises a plurality of random access memory cells arranged in rows and columns. A register set can be loaded via a parallel access port in response to a single latch signal. A path couples at least a portion of a selected row of the DRAM array to the parallel access ports of the register set. A selector switch is operative to couple the register set to a set of functional units. The functional units are operative to manipulate data contained therein. The selector switch is also operative to couple the register set to a data assembly unit. The data assembly unit is operative to generate control signals to load or store the subsets of registers from and to a selected DRAM row, to move data from one register to another within the subset of registers, or to move data between registers from different subsets of registers.

Another aspect of the present invention is an embedded-DRAM processor which comprises a DRAM array which comprises a plurality of random access memory cells arranged in rows and columns. The processor also includes a set of row address registers. One or more of sets of registers are each capable of being loaded or stored in response to a single latch signal. An instruction set includes (i) at least one command to perform arithmetic on the row address registers, (ii) a command to precharge (activate) rows pointed to by the row address registers, (iii) a command to deactivate rows pointed to by the row address registers, (iii) a command to load a plurality of words of a row designated by the row address registers into designated sets of data registers, and (iv) a command to load selected columns of rows pointed to by the row address registers into designated sets of data registers, the selection based on bits in a mask. Preferably, the processor further comprises first and second sets of functional units. The first and second sets of functional units have respective first and second instruction sets and access first and second architectural register sets. A command is provided to select one of the first and second sets of registers to be an architectural set of registers accessible to the first set of functional units. Another command is provided to deselect the other of the first and second sets of registers so that it is no longer an architectural register set accessible to the first set of functional units. A further command is provided to select one of the first and second sets of registers to be an architectural set of registers accessible to the second set of functional units. A further command is provided to deselect the other one of the first and second sets of registers so that it is no longer an architectural register set accessible to the second set of functional units. Alternatively, a command selects one of the first and second sets of registers to be an architectural set of registers accessible to the first set of functional units, and, at the same time, deselects the one of the first and second sets of registers to be an architectural set of registers accessible to the second set of functional units.

Another aspect of the present invention is an embedded-DRAM which comprises a plurality of DRAM arrays. Each of the DRAM arrays comprises a plurality of random access memory cells arranged in rows and columns. A task control block DRAM array comprises a plurality of random access memory cells arranged in rows and columns, wherein the number of columns exceeds the number of rows, and the number of columns matches the amount of volatile information that needs to be saved when performing a task switch. An exception handling sequential logic circuit performs the steps of (i) recognizing a specified event that arises in either hardware or software, and continuing to process instructions, (i) precharging a row in the task control block DRAM array, (iii) after a delay related to the precharging time of the row, ceasing to process instructions and saving the volatile information in the row, and (iv) resuming the fetching of instructions from an address related to the recognized event.

Another aspect of the present invention is an embedded-DRAM processor which comprises a plurality of DRAM arrays. Each of the DRAM arrays comprises a plurality of random access memory cells arranged in rows and columns. A task control block DRAM array comprises a plurality of random access memory cells arranged in rows and columns, wherein the number of columns exceeds the number of rows, and the number of columns matches the amount of volatile information that needs to be saved when performing a task switch. An SRAM latch is included which has the same number of columns as the task control block DRAM array. An exception handling sequential logic circuit performs the steps of (i) recognizing a specified event that arises in either hardware or software, and continuing to process instructions, (ii) precharging a row in the task control block DRAM array related to the recognized event, (iii) after a delay related to the precharging time of the row, ceasing to process instructions and saving the volatile information in the SRAM latch, (iv) loading the precharged row containing volatile information into the processor, and (v) resuming the fetching of instructions from an address related to the recognized event. Preferably, the exception handling sequential logic circuit further performs, in parallel with the loading step and the resuming step, the step of precharging a second row in the task control block DRAM array. The second row is related to the process which was being executed prior to the recognized event. The exception handling logic circuit stores the contents of the SRAM latch in the second row.

Another aspect of the present invention is a computer system which includes input/output devices and an embedded-DRAM. The computer system comprises a plurality of DRAM arrays. Each DRAM array is arranged as a plurality of rows and columns of memory cells. A set of row-address registers is also included. At least one register file comprises a first parallel access port operative to load or store contents of the register file in a single cycle from or to a DRAM row as selected by the row-address register. The register file further comprises a second set of access ports operative to transfer data to and from selected individual registers in the register file. The computer system includes commands operative to manipulate the row-address registers and commands operative to perform precharge operations to activate and deactivate DRAM rows. Further commands are operative to load and store DRAM rows to or from the at least one register file. Still further commands are operative to mask certain fields of the row so that the parallel access load and store operations can selectively transfer only a subset of the selected row to or from the at least on register file. Additional commands are operative to access selected ones of the registers as operands and to process information contained therein.

Another aspect of the present invention is a computer system which includes input/output devices and an embedded-DRAM processor. The computer system comprises a plurality of DRAM arrays. Each DRAM array is arranged as a plurality of rows and columns of memory cells. A plurality of register files are included. Each register file comprises a first parallel access port operative to load or store contents of the register file in a single cycle from or to a DRAM row as selected by the row-address register. Each register file further comprises a second set of access ports operative to transfer data to and from selected individual registers in the register file. The computer system includes a set of functional units and a data assembly unit. The data assembly unit executes commands operative to manipulate the row-address registers, commands operative to perform multiple word load and store operations from or to DRAM rows to or from the at least one register file, and commands operative to place a selected register file in the architectural register set of the functional units. The functional units execute commands operative to manipulate data stored in selected ones of the register files.

Another aspect of the present invention is a data assembly unit which comprises a set of row-address registers and one or more mask registers. A row-address arithmetic unit is operative to manipulate addresses stored within the row-address registers under program control. A mask logic unit is operative to manipulate bits in the mask register under program control. An instruction prefetch register is operative to receive instructions from an external source or from a local program store. An inter-register move unit is operative to control the movement of data between registers in one or more sets of external data register files. A control interface comprises row address lines, row precharge control lines, read/write control lines, and mask bit lines. The control interface is operative to control the parallel movement of rows of information stored in external memory arrays to and from the external register files.

Another aspect of the present invention is a method in an embedded-DRAM processor which incorporates wide data paths to memory. The method is a method of intelligent caching which comprises the steps of segmenting the architecture into first and second portions, executing instructions by the first portion which manipulate only register operands, and executing instructions by the second portion which perform row-oriented load/store operations as well as individual register-to-register move operations. The first portion of the architecture sees a subset of the total available registers as its set of architectural registers. The first portion of the architecture comprises one or more functional units which execute a first program comprising instructions using register operands. The second portion of the architecture executes a second program tightly coupled to the first program. The second program comprises parallel row-oriented load/store/mask commands, register-to-register move commands, and architectural register set switch commands to insure that data accessed by the first program is available when it is needed.

Another aspect of the present invention is a method for intelligent caching. The method comprises the step of splitting an architecture into first and second portions. The first portion comprises a set of functional units and a set of architectural registers exercised thereby. The second portion comprises at least one functional unit capable of moving data between a main memory and the first set of architectural registers. The method includes the further step of splitting a single program into first and second portions. The first portion of the program is executed on the first portion of the architecture. The second portion of the program is executed on the second portion of the architecture. The second portion of the architecture is operative to prefetch data into the architectural registers prior to being processed by the first portion of the architecture. The second portion of the architecture is operative to move results produced by the first portion of the architecture into main memory after they are produced by the first portion of the architecture. Prior to when the first portion of the architecture executes a conditional branch instruction, the second portion of the architecture prefetches first and second data sets from memory into the architectural registers. The first data set is needed when the condition evaluates to true. The second data set is needed when the condition evaluates to false.

Another aspect of the present invention is a method in an embedded-DRAM processor which comprises a plurality of DRAM arrays, wherein the arrays comprise rows and columns of random access memory cells. The processor includes a set of functional units which execute a first program, and includes a data assembly unit which executes a second program. The second program is tightly coupled with the first program. The data assembly unit is operative to load and store a plurality of data elements from a DRAM row to or from one or more register files. Each register file includes a parallel access port. The method is a method of intelligent caching which comprises the step of executing a first sequence of instructions on the set of functional units. The functional units are operative to process data stored in the register files. The method includes the step of executing a second sequence of instructions on the data assembly unit. The data assembly unit is operative to transfer data between the register files and main memory. The second sequence of instructions instructs the data assembly unit to prefetch data into the register files from the DRAM arrays via the parallel access port. When conditional logic in the first program makes it uncertain as to the data which will next be needed by the functional units executing the first sequence of instructions, the second sequence of instructions instructs the data assembly unit to prefetch time-critical data so that irrespective of the conditional outcome in processing the first sequence of instructions, the required data will be present in the registers.

Another aspect of the present invention is a method in an embedded-DRAM processor wherein the embedded DRAM processor comprises a plurality of DRAM arrays which comprise rows and columns of random access memory cells. A set of functional units executes a first program, and a data assembly unit executes a second program. The second program is tightly coupled with the first program. The data assembly unit is operative to load and store a plurality of data elements from a DRAM row to or from one or more register files which each includes a parallel access port. A selector switch is operative to include or remove a register file from the architectural register set of the functional units executing the first sequence of instructions. The method is a method of intelligent caching which comprises the step of executing the first sequence of instructions on the functional units, whereby the instructions involve operands, and the operands correspond to architectural registers visible to the functional units. The method includes the step of executing the second sequence of instructions on the data assembly unit, whereby the execution of the second sequence of instructions is operative to prefetch information into one or more register files which are not architectural registers visible to the functional units. In response to progress made in the first program, the data assembly unit executes one or more instructions which transform the one or more register files which received prefetched data into architectural register files visible to the functional units and transform current architectural register files into non-architectural register files which are inaccessible to the functional units. Preferably, the method includes the additional step of speculatively prefetching information needed by two or more execution paths when a conditional branch in the first instruction sequence makes it ambiguous as to which data will next be needed by the functional units.

Another aspect of the present invention is a method of pipeline processing instructions on an embedded-DRAM, wherein each step of the method operates on different data and occurs in a substantially overlapped fashion. The method comprises the steps of: issuing a precharge command by a data assembly unit to precharge one or more designated rows of memory cells located in one or more DRAM arrays; issuing a data move command by a data assembly unit to move a plurality of data words from a previously precharged row into a designated register file; issuing a register map command by a data assembly unit to map a previously loaded register file into the architectural register space of a set of functional units; and executing instructions by a set of functional units to perform arithmetic operations on a set of architectural registers accessed through the execution of opcodes corresponding to instructions whose operands reference the architectural registers. Preferably, the method further comprises the steps of determining whether execution of instructions by the functional units encounters conditional instructions which make it ambiguous as to which data will be needed in subsequent instructions; and, when it is ambiguous as to which data will be needed in subsequent instructions, precharging and prefetching multiple data sets that may be needed depending on the outcome of the conditional instructions. Also preferably, the method further comprises the step of determining whether execution of instructions by the functional units encounters a conditional branch instruction so that it becomes ambiguous as to whether data associated with a fall-through instruction or a branch target instruction will next be needed by the functional unit; and, when it becomes ambiguous whether data associated with a fall-through instruction or a branch target instruction will next be needed by the functional unit, prefetching data predicted to be needed and speculatively precharging one or more rows in the DRAM arrays containing data that will be needed if the prediction is wrong. The prediction is preferably made by the data assembly unit based on information in a branch history table. Alternatively, the prediction is made by the data assembly unit based on information contained in a loop counter used by the first program.

Another aspect of the present invention is a method of object oriented processing in a computer system incorporating an embedded-DRAM processor. The embedded-DRAM processor comprises a set of functional units which operate on a set of architectural registers. A data assembly unit performs multi-register parallel load and store operations between a set of register files and a main memory which comprises a set of DRAM arrays. Each DRAM array comprises rows and columns of memory cells. The method comprises the step of executing an object oriented program written in a high level programming language on the embedded-DRAM processor. The program involves the use of data objects comprising a set of data arranged in predefined manner. The method includes the step of partitioning the object-oriented program into an operational program and a data assembly program. The operational program is operative to manipulate data stored in the data objects. The data assembly program is operative to move data between the main memory and the register files. The data assembly program is also operative to assemble the data into the register files in a predefined format corresponding to the organization of the data objects. The method includes the step of simultaneously executing the operational program and the data assembly program. The data assembly program is operative to assemble at least portions of the data objects into the register files. The operational program is operative to access and manipulate the data structures or the objects presented thereto in the register files. Preferably, the data objects are presented to the operational program by selecting the register file containing the preassembled data to be an architectural register file visible to the operational program.

Another aspect of the present invention is a method in an embedded-DRAM processor which comprises a data assembly unit and a plurality of DRAM arrays. Each DRAM comprises rows and columns of memory cells. The method is a method of performing BitBLT (bit block transfer) operations. The method comprises the step of loading a plurality of bits of data in parallel from a selected row of the DRAM arrays into a register file containing a parallel access port and a set of individual register access ports. The method further comprises the step of operating on the data using a mask and switch unit to perform at least one of the steps of passing the data through unchanged, masking certain bits from being moved, and permuting the location of words or bits. The method also includes the steps of storing the contents of the register file to a target row of the DRAM array memory using a parallel register file store command, and controlling which words or bits of the register are written to the row by processing a store instruction responsive to a mask. Preferably, the step of permuting is performed by barrel-shifting. Also preferably, the method comprises the further steps of accessing the data loaded in the register file using a set of individual register access ports and performing shifts or other manipulations of individual words contained in the registers prior to storing the register file back into a row of the DRAM array. In certain embodiments, the method comprises the further steps of loading a second plurality of bits of data in parallel from a selected row of the DRAM arrays into a second register file containing a parallel access port and a set of individual register access ports, and accessing the data loaded in the register file and the second register file using a set of individual register access ports and performing combinational manipulations of individual words of the data contained in the register file and the second register file prior to storing manipulated result data back into a row of the DRAM array.

Another aspect of the present invention is a method in an embedded-DRAM processor which comprises a plurality of DRAM arrays which comprise rows and columns of random access memory cells. A set of functional units execute a first program, and a data assembly unit executes a second program. The second program is tightly coupled with the first program, and the data assembly unit is operative to load and store a plurality of data elements from a DRAM row to or from one or more register files which each includes a parallel access port and individual register access ports. The method is a method of processing pseudo load/store commands found within the first program. The method comprises the steps of executing a speculative load command in the second program prior to the execution of at least one load command in the first program, executing a load command in the first program on one of the functional units, and passing the prefetched data from the second program to the second first program in response to a load address generated by a load command in the first program. Preferably, the method further includes the steps of executing a speculative row precharge command in the second program prior to the execution of at least one store command in the first program, executing a store command in the first program on one of the functional units, passing the data to be stored from the first program to the second program, and storing the data into a precharged DRAM row by the second program. Also preferably, the data are passed to and from the first program from and to the second program by transferring data from an architectural register in the first program to and from a register accessible to both programs. Also preferably, data are passed to and from the first program from and to the second program by reassigning a register in the architectural register set of one program to be in the architectural register set of the other program. Also preferably, data are loaded and stored directly to and from the architectural registers of the first program by the data assembly unit during a time interval when the first program executes the load or store command.

Another aspect of the present invention is a scroll-RAM which comprises a plurality of DRAM banks. Each DRAM bank comprises one or more DRAM arrays. The DRAM arrays are stacked to provide parallel word-width data outputs, wherein each of the DRAM arrays comprises random access memory cells arranged in rows and columns. One or more row address control inputs are operative to simultaneously select one row in each of a plurality of the DRAM banks. A set of multiplexers is coupled to the plurality of DRAM arrays. The multiplexers are operative to select a subset of columns in each the selected row. An interconnection network is responsive to the multiplexer outputs and is operative to forward the selected subset of columns to a parallel-access port of a register file. Preferably, the interconnection network is responsive to a mask word that selects data to be forwarded or to not be forwarded. Also preferably, the interconnection network includes a barrel-shift function or a barrel-rotate function. Preferably, the multiplexers are bi-directional multiplexer/demultiplexers, and the scroll-RAM can be used to both load and store data objects contained in the DRAM banks.

Another aspect of the present invention is a method to store a matrix in a DRAM array and to access data blocks contained therein. The method comprises the step of storing a matrix in a plurality of DRAM banks, wherein each DRAM bank comprises a set of DRAM arrays. Each array comprises rows and columns of memory cells. The arrays are arranged in the bank to provide for parallel accessing of data words, whereby rows of data words contained in the matrix are assigned to rows of the DRAM banks in a wrapped and interleaved fashion. The method includes the additional step of accessing a plurality of rows of words in parallel from a plurality of the DRAM banks. The method includes the additional step of selecting subsets of columns in each of the accessed rows and forwarding these in parallel to an interconnection network. The method further includes the step of passing the selected rows from the interconnection network to a parallel access port of a register file for further processing by a set of functional units. In preferred embodiments, the matrix is an image and the blocks correspond to data objects manipulated by an image processing algorithm such as a video encoder or a video decoder. Preferably, the interconnection network masks out certain fields to prevent these fields from being transferred to the register file. Also preferably, the interconnection network further permutes the data being transferred to arrange it in a programmably controlled format.

Another aspect of the present invention is a method to reduce the amount of instruction cache needed in an embedded-DRAM processor. The method comprises the step of storing a program in a row-interleaved fashion among a plurality of DRAM arrays, wherein one or more instruction fetch packets are stored on each row. When a sequence of consecutive instruction fetch packets is to be read, the method reads the consecutive sequence of consecutive fetch packets or groups of fetch packets from interleaved rows of different DRAMs, and the method pipelines the precharging and fetching operations so as to increase the number of rows that can be accessed per time interval by substantially the number of DRAM banks involved in the interleaving. The method further includes the step of caching only the minimum number of fetch packets found in branch target instruction streams in a branch-oriented instruction cache so that when the sequential accessing pattern is interrupted and interleaving is rendered ineffective, the cache supplies only the minimum number of fetch packets needed to allow the interleaved prefetch pipeline time to begin fetching from the branch target address. Preferably, the caching is performed by sending tags related to instructions in the instruction stream to the cache, and, when a tag matches a stored tag, providing the cached fetch packets to the instruction stream. When a branch is deemed to be taken but the tag does not match a stored tag, the method performs a cache miss operation to fill the cache line with the information so that the next time the tag is encountered, a hit will occur provided the line has not been previously evicted. Also preferably, the caching is performed using a preloaded cache containing a prespecified set of cache lines to supply branch target instructions when the interleaving mechanism fails due to non-sequential accesses. Preferably, the caching is performed by comparing a tag which is found substantially ahead of the branch instruction in the instruction stream. A speculative precharge is therefore performed in one or more alternate DRAM arrays used to supply branch target fetch packets to preempt delays caused by branching.

Another aspect of the present invention is a method to eliminate the need for an SRAM instruction cache for a dispatched instruction stream of an embedded-DRAM processor. The method comprises the step of distributing fetch packets of a program among at least three synchronous DRAM (SDRAM) arrays, including first, second, and third SDRAM arrays. The method also includes the step of storing consecutive access portions of a program in a row-interleaved fashion on at least the first and second SDRAM arrays. Multiple instruction fetch packets are stored on each row of each of the SDRAM arrays. The SDRAM arrays support a burst transfer mode wherein one fetch packet may be read from the SDRAM array on every clock supplied to the SDRAM array. The method includes the step of reading as many as one of the instruction fetch packets per clock out of the first SDRAM array using the burst transfer mode. While the burst transfer occurs in the first SDRAM array, the method precharges a row in the second SDRAM array containing the next fetch packets to be accessed by the program. The method includes the step of storing branch target fetch packets in a third SDRAM array. Thus, when a branch is encountered eminent in the instruction stream being read from the first SDRAM array, the fall-through prefetch packets can be precharged in the second SDRAM array while the branch target fetch packets can also be speculatively precharged in the third SDRAM array. When the branch is resolved, the pipelining of bank interleaved fetching may continue without delay. Preferably, the roles of the first, second and third SDRAM arrays may switch back and forth as the program is being executed.

Another aspect of the present invention is a method to eliminate the need for an SRAM instruction cache for a dispatched instruction stream of an embedded-DRAM processor. The method comprises the steps of distributing fetch packets of a program among at least three DRAM arrays, including first, second, and third DRAM arrays; and storing consecutive access portions of a program in a row-interleaved fashion on at least the first and second DRAM arrays, wherein multiple instruction fetch packets are stored on each row of each of the DRAM arrays. The first, second and third DRAM arrays are coupled to one or more SRAM latches so that a plurality of fetch packets can be latched into at least one of the one or more SRAM latches and accessed at a rate higher than the rate at which column data can be read out of any single DRAM array. The method further includes the step of sequencing as many as one of the instruction fetch packets per clock from the at least one of the one or more SRAM latches to be dispatched to a set of functional units. While sequencing instruction fetch packets from the at least one of the one or more SRAM latches, the method precharges a row in the second DRAM array containing the next fetch packets to be accessed by the program. The method includes the further step of storing branch target fetch packets in the third DRAM array so that when a branch is encountered eminent in the instruction stream being read from the first DRAM array, the fall-through prefetch packets can be precharged in the second DRAM array while the branch target fetch packets can also be speculatively precharged in the third DRAM array. As a result, when the branch is resolved, the selected row can be latched into the one or more SRAM latches and fetching may continue from the one or more SRAM latches.

Another aspect of the present invention is an embedded-DRAM processor architecture which includes a set of DRAM arrays, a set of register files, set of functional units, and a data assembly unit. The data assembly unit includes a set of row-address registers and is responsive to commands to activate and deactivate DRAM rows and to control the movement of data throughout the system. With respect to this aspect of the present invention, large SRAM caches and traditional caching policies are replaced with a pipelined data assembly approach so that the functional units perform register-to-register operations, and so that the data assembly unit performs all load/store operations using very wide data busses. Data masking and switching hardware is used to allow individual data words or groups of words to be transferred between the registers and memory. The data assembly unit acts as an intelligent cache controller to perform look-ahead operations to insure exactly those data words that are needed by the functional units are available in a much smaller cache when they are needed. Other aspects of the invention include a memory and logic structure and an associated method to extract data blocks from memory to accelerate, for example, operations related to image compression and decompression. New techniques and structures minimize the amount of instruction cache needed to execute programs at full speed from a DRAM-oriented program memory.

BRIEF DESCRIPTION OF THE FIGURES

The various novel features of the invention are illustrated in the figures listed below and described in the detailed description which follows.

DETAILED DESCRIPTION OF THE PREFERRED EMBODIMENT

Figure 1:
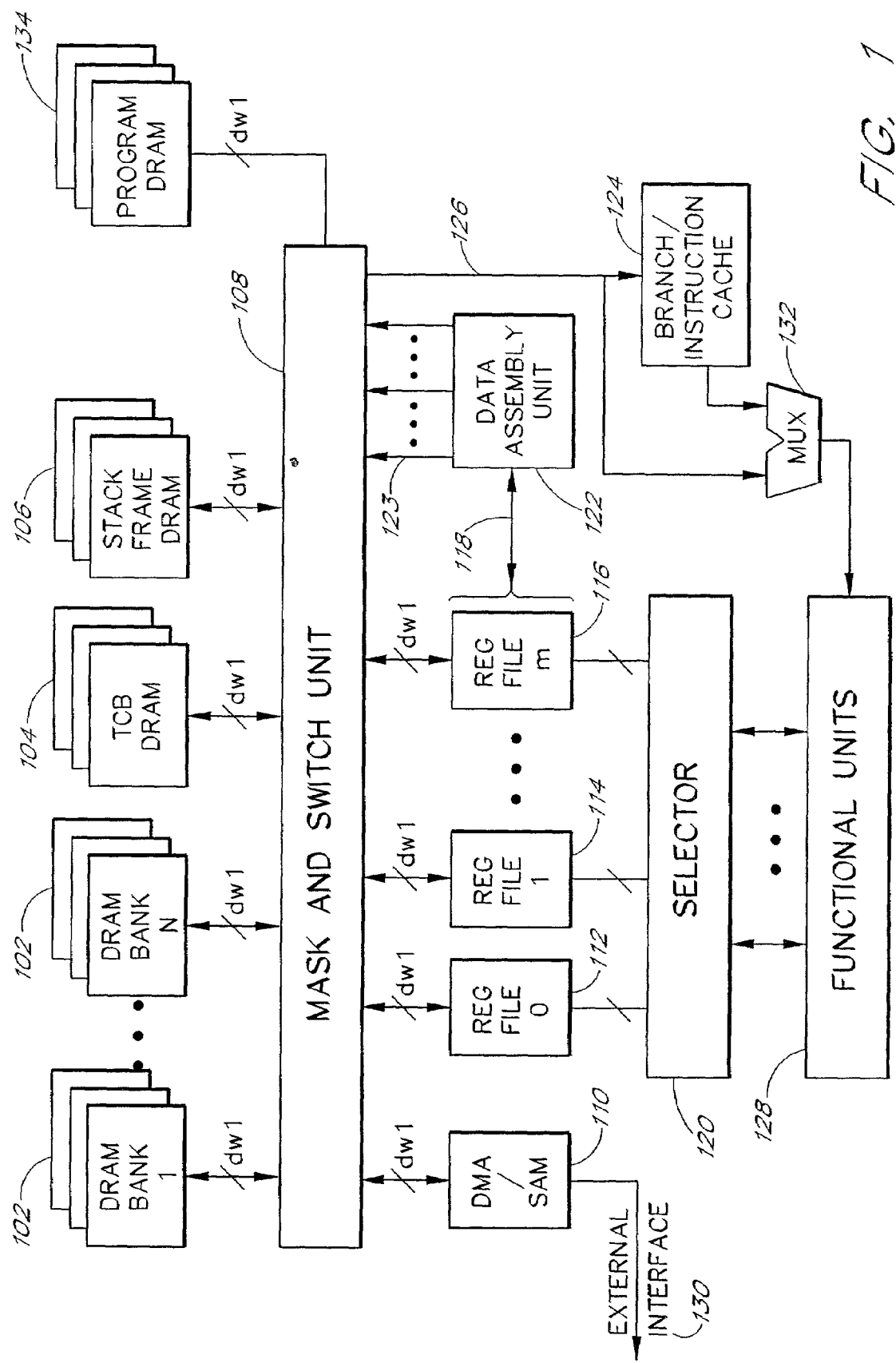
FIG. 1 is a block diagram that illustrates an embodiment of the embedded-DRAM processor architecture of the present invention.

FIG. 1 is a block diagram that illustrates an embodiment of the embedded-DRAM processor architecture of the present invention. A set of N DRAM banks 102 are coupled to a mask and switch unit 108 via data busses of width dw1.

The number dw1 is defined in words, and each word contains b bits. In the preferred embodiment, the number dw1 is equal to the number of columns in a DRAM row, for example, dw1=128. The DRAM banks 102 are preferably stacked according to the number of bits, b, in a word as defined by the architecture. For example, if a set of functional units 128 operate on 16-bit quantities, then b=16 and each of the DRAM array 102 is preferably stacked to provide dw1 16-bit words. For example, in the preferred embodiment, the number N is equal to 64, and each DRAM array 102 is organized as a stack of sixteen 16,384-bit DRAMs containing 128 columns and 128 rows. When stacked into 16-bit word modules, a total of 16 megabits are provided among all the DRAM arrays 102. Arrays on the order of 1 gigabit are anticipated to be available in coming years, and systems with different numbers and sizes of DRAMs are within the scope of the invention. For example, a 1-gigabit system can be constructed using 64, 16-bit banks of 256×256 DRAM arrays. The mask and switch unit 108 is an interconnection network which, in its simplest embodiment, may provide a simple pass-through. Depending on the embodiment, the mask and switch unit 108 may selectively block specified data fields, and may also permute and/or multiplex specified data fields. A task control block (TCB) DRAM array 104 is also preferably included in the system and is coupled to the mask and switch unit 108 via a data bus whose width is dw2 words wide. A stack frame DRAM 106 is also preferably included and is coupled to the mask and switch unit 108 via a data bus with a width of dw1 words. A direct memory access controller/serial access memory (DMA/SAM) 110 with an external interface 130 is also preferably coupled to the mask and switch unit via a data bus, also preferably of width dw1 bits wide.

A set of three high-speed register files 112, 114, and 116 are connected to the mask and switch unit 108, also preferably via dw1-word wide data busses. In alternate embodiments, rows of width dw1 may be sub-divided and sent to smaller register files, or can be multiplexed and sent to the register files in a plurality of transfer cycles. The register files 112, 114, and 116 are preferably implemented using high speed SRAM technology and are each coupled to a selector 120 which in turn couples the register files 112, 114, 116 to the set of functional units 128. While the preferred embodiment employs three high-speed register files 112, 114, 116, systems with other numbers of register files are anticipated. To implement aspects of the present invention, at least two high-speed register files 112, 114 should be used. A data assembly unit 122 is coupled via address and control lines 118 to the high-speed register files 112, 114, and 116. In some embodiments, additional data paths may be used to transfer data between internal registers located within the data assembly unit 122 and registers located within the register files 112, 114 and 116. The data assembly unit 122 is also coupled via control and address lines 123 to the mask and switch unit 108. Address information delivered to the mask and switch unit 108 from the data assembly unit 122 is further coupled to the address and control inputs of the DRAM array modules 102, 104, 106 as well as to the DMA/SAM 110. The set of functional units 128 optionally receive program instructions as selected by a multiplexer 132. The multiplexer 132 has one input coupled to an interleaved DRAM program memory array via a set of lines 126 and the mask and switch unit 108. The multiplexer 132 has another input coupled to an output of a branch-oriented instruction cache 124. The program memory DRAM array is preferably implemented with a dw3 width data bus, where dw3 represents the number of instructions to be prefetched into the a prefetch buffer (not shown). The prefetch buffer holds instructions to be executed by the functional units 128. In some implementations, the prefetch buffer may also contain instructions to be executed by the data assembly unit 122 as well. The program memory array 134 is also preferably stacked into an interleaved access bank so that one fetch packet containing instructions may be fetched per clock cycle when instructions are fetched from a sequential set of addresses. As will be discussed below in connection with FIG. 5, the program DRAM 134 may also preferably contain multiple fetch packets that can be accessed in a clocked burst mode similarly to the way column data is read out of prior art synchronous DRAMs (SDRAMs).

The embodiment of FIG. 1 executes programs stored in the program DRAM bank 134 and operates on data stored in the DRAM banks 102, 104, and 106 using a minimum amount of SRAM cache. The details of instruction fetching from DRAM and the operation of a minimal branch-oriented instruction cache will be described below in connection with FIG. 5 and FIG. 6. According to the present invention, the amount of high speed SRAM needed for data memory or data cache is minimized using a concept of intelligent caching. In intelligent caching, a cache controller has specific knowledge of the executing program, and itself executes a program to keep the high-speed cache memory full of useful data. By this use of the word cache is meant any small, high-speed data or program store that is used to prevent the processor form waiting for slower bulk memory. The cache does not necessarily use set-associative, direct-mapped or least recently used policies as found on prior art caches.

To implement intelligent caching, the data assembly unit 122 and the functional units 128 pipeline the processing of arithmetic operations and load/store operations. A programming model is presented wherein the functional units 128 perform arithmetic operations on data stored in one or more architectural register files. An architectural register file is a register file visible to the programmer, i.e., is a register file whose registers may be referenced as operands in instructions executed by the functional units 128. The selector 120 can switch different ones of the register files 112, 114, 116 to be the architectural register file. A selected register file is said to be an active register file. A deselected register file register file is not accessible to the functional units 128 and is said to be an inactive register file. While the functional units execute instructions whose operands all correspond to architectural registers, the data assembly unit performs load/store and possibly register-to-register move operations on the inactive register files. Control and data paths may also be provided to allow the data assembly unit to move individual data elements between an inactive register file and an active register file. The idea of an intelligent cache structure is to split the architecture into a core execution portion and an intelligent data assembly portion. First and second programming models are used to implement a single program. The first programming model is used by the functional units and only involves register-to-register operations in the architectural register files. In some embodiments, load/store operations, or pseudo load/store operations as will be subsequently discussed may also be supported. The second programming model is used to program the data assembly unit 122. The data assembly unit 122 executes a supervisor portion of the program and is preferably able to see all the register sets, active and inactive. The data assembly unit 122 executes a program that performs look-ahead oriented data-move operations to insure data used by the functional units 128 is available when it is needed. When conditional execution and branching create uncertainties as to what data will be needed, the data and assembly unit may speculatively precharge DRAM rows and/or speculatively prefetch data to be used by the functional units 128. Depending on the condition, one or another data set can be selected to become the active register set. Instead of a "dumb" caching policy which just keeps the most recently used data in the cache, and operates on a hit-or-miss basis, the data assembly unit 122 takes an active role in the execution of the program to insure that exactly the required data is available in the small cache implemented as a collection of register files.

In some implementations, all of the register sets may be visible to the functional units 128 at all times. In this case, there are no active register sets or inactive register sets except in the sense that different groups of registers will be accessed by the data assembly unit 122 while others will be accessed by the functional units 122. In this case, the present invention uses switched data paths to allow the functional units and the data assembly unit 122 parallel access to the registers. The program is responsible to insure that the functional units access certain registers and the data assembly unit 122 accesses others in a given cycle. In this case, the data assembly unit 122 can still fork independent execution threads and monitor branch activity of the main program to perform different speculative data accessing maneuvers to fill and empty the register files. Flag bits may be made available from the functional unit's pipelines indicative of which registers are being used in a given cycle. Also, since the data assembly unit 122 has full knowledge of the executing program, it may control a parallel path masked load mechanism to set up a subset of the registers that it knows is not being used by the main program at the time.

As will be discussed in greater detail below in connection with FIGS. 2–4, the data assembly unit 122 is operative to control the DRAM arrays using a set of row-address pointer registers. A set of activation bits is manipulated under program control to activate or deactivate entire rows of selected DRAM banks in the DRAM arrays 102, 104, 106. Hence, while the DRAM access times are slower than the high speed SRAM register file's access times, very wide data paths dw1, dw2 are used to move entire rows (or subsets thereof) to the register files all at once. This increases the raw bandwidth available from the DRAM. Based on the concept of spatial locality of reference, most often, these row-level transfers will efficiently service most data demands. In signal and image processing, the parallel loads will often move the needed portion of the data set in one or two transactions. For example, in FIR (finite impulse response) filtering, one set of registers is used to hold the filter coefficients, while another set is used to hold the data. While the functional units compute the inner-product between the coefficients and the data, the data assembly unit 122 will have ample time to load the next set of coefficients and the next set of data values into inactive registers. When the innerproduct is complete, the inactive registers can be activated so that processing may continue. As will be discussed below in connection with FIG. 4, different configurations of the mask and switch unit may be used to move data objects located on the DRAM arrays 102.

The data assembly unit 122 has at its disposal the ability to precharge a given DRAM row ahead of time, and also has the ability to move large data blocks all at once. The data assembly unit 122 also works in conjunction with the mask switch unit 108 to enable the transfer of selected words or groups of words within a row. The data assembly unit 122 is able to move data from one register location to another within or between register files. Since the data and assembly unit 122 is able to control the selection of the active file as seen by the functional units 128, it can execute instructions to assemble a packet of data to be processed by the functional units to preempt waiting due to cachemisses. In cases where branching makes it unclear as to what data will be used, the data assembly unit 122 is free to speculatively precharge DRAM rows, to speculatively prefetch time-critical data that may be needed in both branch paths, or to do both. In signal and image processing applications where very regular indexing patterns are used to access large data structures, this solution is especially optimal and easy to implement.

Data movement on and off chip through external interface 130 is preferably controlled via the DMA/SAM 110. The DMA functionality of the DMA/SAM 110 is used to control the transfer of blocks of data to and from an external memory from and to the internal DRAM arrays 102. The SAM (serial access memory) functionality may be used as a video RAM port in conjunction with a display device. The DMA/SAM 110 enables high speed I/O and frame buffer operations with minimal intervention by the processor. The data assembly unit 122 is preferably responsible to configure the DMA/SAM 110 and can send commands to initiate individual or burst transfers when needed. In some embodiments, the external interface 130 may include, for example, a PCI compliant bus interface in addition to a SAM port.

The optional TCB DRAM 104 is provided to store the volatile portion of the processor for low-cost task switching. Upon recognition of an interrupt, the data assembly unit 122 activates a row in DRAM pointed to by a current task pointer. When the row is precharged, the active register file is saved and the next task's active register file is loaded. In cases where the inactive register files need to be saved, this can normally be done in the background. The TCB DRAM is typically implemented in a rectangular array with much fewer rows than columns. One row is needed for each task, and one column is needed for each nonvolatile bit that needs to be saved on a task switch. In the preferred embodiment, this includes the active register set, a program counter, and a status register. In one embodiment of a method for task switching, only the active register set is saved, and any write-data in the inactive register sets are saved in the background by the data assembly unit 122. The program in the data assembly unit 122 is backed up to the point where the current packet is being prepared for the functional units.

The optional stack frame DRAM bank 106 is responsive to stack push and pop commands used to allocate and deallocate subroutine local variable spaces on the top of a stack. This functionality can also be implemented with the standard DRAM arrays 102.

Figure 2:
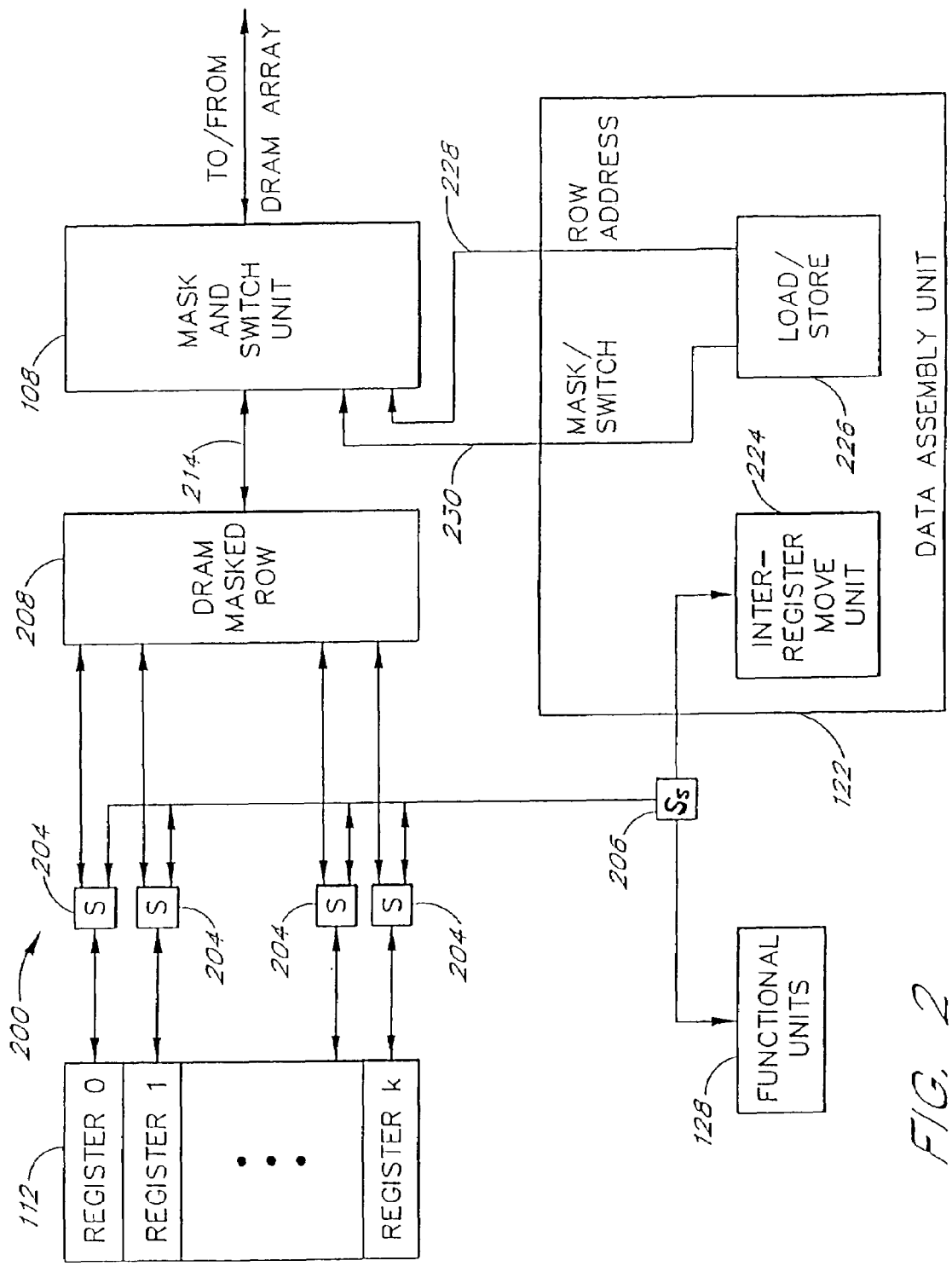
FIG. 2 is a block diagram that illustrates an embodiment of a register file comprising row-parallel and word-parallel data paths.

FIG. 2 shows one embodiment of the invention highlighting the data transfer and register selection mechanisms 200 between the DRAM arrays 102 and, for example, the register file 112. The connections to the other register files 114, 116 are similar. The register file 112 is coupled to a set of switches 204. Each of the switches 204 includes a first port coupling to the register file 112, a second port coupling to a parallel load/store channel carrying a masked DRAM row 208 to or from the mask and switch unit 108 via an interface 214. Each switch 204 also includes a second port coupling to a selector switch 206. The selector switch 206 selectively couples the registers of the register file 112 either to the functional units 128 or to the data assembly unit 122. Specifically, the second port of the selector switch 206 couples the registers 112 to an optional inter-register move unit 224 included within the data assembly unit 122. The data assembly unit 122 also includes a load/store unit 226.

The load/store unit 226 presents a mask switch control input 230 to the mask and switch unit 108. The load/store unit 226 also presents a row-address input 228 to the mask and switch unit 108. In some embodiments, the row address control 228 may pass directly to the DRAM arrays 102, 104, 106. In the embodiment shown, the mask and switch unit 108 performs address decoding functions as well as its other tasks.

In the execution of a program, the register file 112 may be selected by the switch 206 to be active or inactive. When the register file 112 is selected to be active, the switches 204 couple multiple parallel data paths between the register file 112 and the functional units 128 by further setting switches 204 to pass data along the path to switch 206. In some implementations, the register 112 may be implemented with dual-port SRAM cells, whereby the switches 204 become an integral part of the register file 112 itself. When the register file 112 is deselected, it may be loaded, stored, or otherwise manipulated by the data assembly unit 122. The switches 204 may be set to couple the register file 112 to the switch 206 so that the inter-register move unit 224 can shuffle data back and forth between registers to arrange data stored within the register file 112 according to the needs of the program. This facilitates object oriented programming because data objects may be loaded from memory into well-defined data structures where data are located at predetermined fixed locations. The switches 204 may also be set to couple the register file 112 to the parallel load/store path so that a full row of DRAM data 208 can be loaded or stored via the mask and switch unit 108. This is called the parallel-access port of the register file. The mask and switch unit 108 provides a limited amount of data path functionality as data passes between the DRAM arrays and the register files. The mask functionality allows certain fields to be masked so that subsets of rows can be accessed. The switch functionality may involve word-level or bit-level permutation operations as well as multiplex-and-combine operations. Multiplex-and-combine operations according to the present invention are discussed in connection with FIG. 4. The switching functionality of various embodiments ranges from no switching at all, to a word level barrel-rotator, all the way to a full bit level crossbar switch. In general, the switching function may be any permutation network deemed desirable for the application. The functionality of the mask and switch unit 108 functionality may be limited to a simple pass-through connection in some implementations. The inter-register move unit 224 is used to perform additional switching functions by moving data within the register file 112 under program control. Inter-register move unit 224 may also include bit-level shift and rotate through carry instructions in some implementations. This is especially useful when performing bit block transfer (BitBLT) operations from one memory area to another. For example, in a BitBLT operation, a masked segment of data may be moved from a row in the DRAM array 102 into the inactive register file 112, shifted, and then moved with a mask operation to a different row in the DRAM array 102.

The system of FIG. 2 provides a way to load the register file 112 while the functional units 128 are processing data in another register file 114 or 116. On a cycle-by-cycle basis, the switch 206 can be switched to activate or deactivate a given bank. In some embodiments, the switch 206 may be coupled to two register files so that portions of two register files can be made to appear as the architectural register set to the functional units. The switches 204 can be set to activate a subset of a first register file while the switches 204 associated with a second register file can be set to activate the other subset of a second register file. For example, data from the register files 112 and 114 can be processed through the functional units concurrently. The same type of switch control can be used when the register files are deactivated, for example, to allow the inter-register move unit 224 to move data from the register file 112 to the register file 114. In some embodiments, the switch 206 functionality can be distributed to each switch 204 to allow individual registers to be designated as active while the inactive registers are still accessible to the inter-register move unit 224. These arrangements enable the concept of intelligent caching according to the present invention. The traditional set associative and direct mapped caching strategies are effectively replaced by a highly agile and program-specific data assembly unit that uses the concept of program look-ahead and speculative precharging and speculative prefetching to insure the data is in the registers when it is needed. This structure converts the available bandwidth provided by DRAMs with wide data paths into a useful architecture that requires only a minimal amount of SRAM to keep the functional units fed with a constant source of data. The functional units process data using only register operands, and all data interaction to and from memory is transparent. While the functional units see a simple programming model comprising a set of defined architectural register files, the data assembly unit 122 moves data in out of these registers in a transparent way. When the functional unit needs data, it may simply assume it is in a given register. The data assembly unit is responsible to get the data to the specified location. Pipeline stalls can largely be detected and often eliminated at compile time to replace the servicing of cache misses at run time. The effectiveness of this approach is made possible by the wide data paths to memory and the memory accessing strategy employed by the data assembly unit.

The present invention extends branch prediction concepts into the data-caching domain. When the program flow is such that the look-ahead operations are uncertain, in accordance with the present invention, data-oriented branch prediction and speculative prefetching policies may be implemented in the intelligent cache to maintain performance levels. In data-oriented branch prediction, the data prefetching as opposed to the instruction prefetching is of concern. In one embodiment, when a branch instruction is encountered, the load/store unit will look at cached branch history data or access known program information such as loop counter variables to predict the branch. Instead of attempting to keep the instruction prefetch buffer full of the next instructions to execute, the data assembly unit attempts to keep the register files full of the next data to be accessed. In speculative data prefetching, when a conditional branch presents an ambiguity as to what data will next be accessed by the functional units 128, both data sets are prefetched and the data that is not needed is flushed. Branch history information may or may not be employed with speculative prefetching. Also, rows of the DRAM 102 may be speculatively precharged even though the data transfer may never occur. These forms of speculative data prefetching are important intelligent caching concepts. In most DSP and media processing applications, a simple program look-ahead prefetching policy with no prediction but with speculative fetching will normally be sufficient to keep the program from needing to wait for data accesses.

Figure 3:
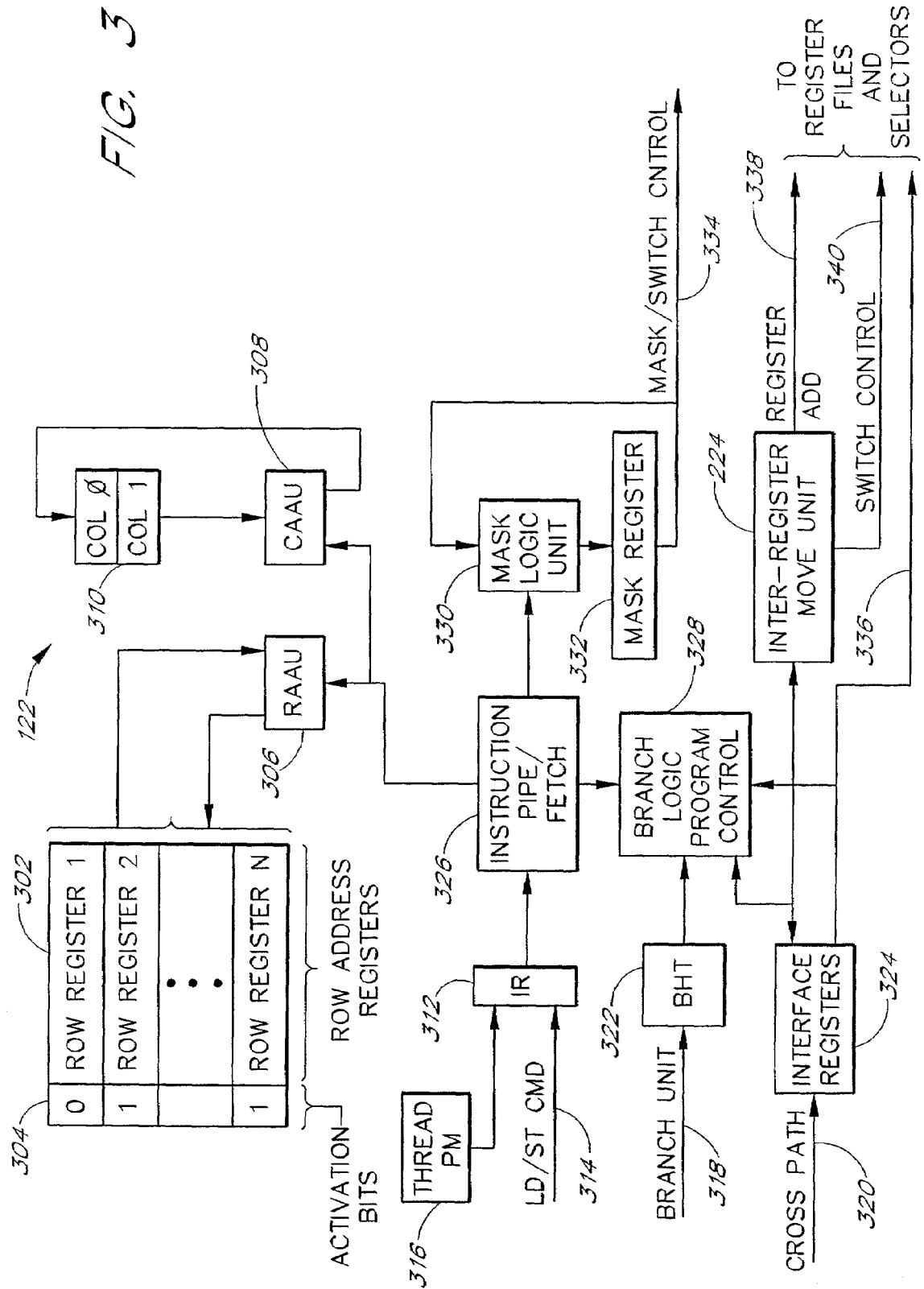
FIG. 3 is a block diagram that illustrates an embodiment of a memory controller designed according to the present invention.

FIG. 3 shows an embodiment of the data assembly unit 122. A set of row address registers 302 is coupled in a feedback arrangement to a row address arithmetic unit (RAAU) 306. Associated with each of the address registers 302 is an activation bit 304. The activation bits 304 can be set or cleared and the row addresses can be modified under program control. A set of optional column registers 310 is coupled to an optional column address arithmetic unit (CAAU) 308. An instruction register (IR) 312 receives load/store commands over a line 314 from a dispatch unit associated with the main instruction stream of the processor. The instruction register 312 may also optionally accept a separate execution thread of instructions from local program memory 316. An instruction pipeline fetch unit 326 controls the instruction stream into the data assembly unit. The instruction pipeline fetch unit 326 dispatches instructions or decoded portions thereof to the various functional components of the data assembly unit such as the RAAU 306, the CAAU 308, a mask logic unit 330, and a branch logic and program control unit 328. An optional branch history table 322 receives branch related information from the main instruction stream to cache branch history information about recently taken branches as is common in prior art branch prediction units used to improve instruction pipeline performance. An optional set of interface registers 324 buffer data to be sent or received by the main functional units 128 over a line 320. The mask logic unit 330 is coupled in a feedback arrangement with a mask register 332 to perform logic operations on the load/store mask. The mask information is sent over a line 334 to a control input of the mask and switch unit 108. The inter-register move unit 224 is coupled to the interface registers 324 and controls a data path 336 to an inactive register file. The inter-register move unit 224 provides register addresses to the inactive register files over a line 338 and provides switch control inputs over a line 340 to control, for example, the switches 204 and 206.

With the architecture of FIG. 3, the data assembly unit 122 is able to operate as a functional unit closely coupled to the main instruction stream of the processor. That is, a dispatch unit that dispatches instructions to the functional units 128 can also dispatch instructions over the line 314 to the data assembly unit 122 as if it were any other functional unit. However, the data assembly unit can optionally include its own program memory 316, which may involve a microprogram memory in some implementations. Whether the program memory 316 is a microinstruction memory or a macroinstruction memory, it can hold sequences of instructions to carry out in response to a single command dispatched by the main dispatch unit. In some embodiments, the branch information received over a line 318 may be additionally used to synchronize the execution of the data assembly unit 122 with the main instruction stream executed by the functional units 128. With the three interfaces (i.e., the instruction register 312, the branch history table and caching unit 322, and the interface registers 324), the data assembly unit 122 can process instructions in lock-step with the main instruction stream or can operate in a more loosely coupled fashion to meet the needs of the executing program.

In operation, the data assembly unit 122 accepts instructions from and monitors parameters of the main program as it executes on the functional units 128. The data assembly unit 122 activates rows of the DRAM before they are actually needed by the program. The data assembly unit 122 also assembles data into an inactive register file using row-oriented masked/switched move commands together with the data move unit 224. Branch information is shared so that the data assembly unit's program flow control unit 328 can speculatively make available data before the functional units 128 need it. The row address unit 306 together with the activation bits 304 are used together with masked row-oriented load/store commands that control the movement of data between the DRAM array and an inactive register file. In some implementations, additional column oriented information may be needed by the mask and switch unit 108 or related DRAM array access resources as will be discussed in connection with FIG. 4.

Figure 4:
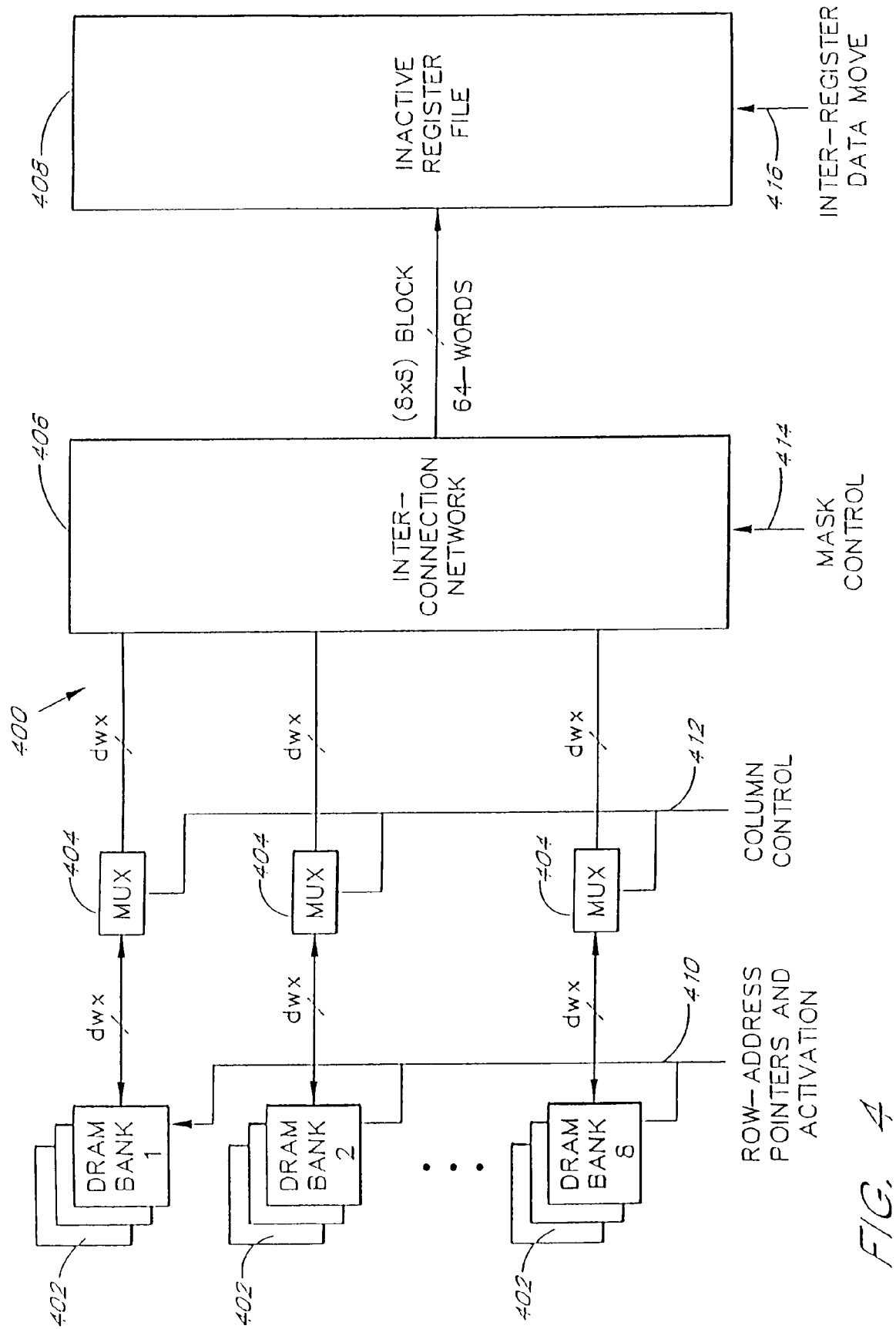
FIG. 4 is a state diagram that illustrates one embodiment of a scroll-RAM used to extract data objects out of an image memory.

FIG. 4 illustrates an embodiment of a scroll-RAM 400 in accordance with the present invention. The exemplary scroll-RAM 400 includes a set of eight DRAM banks 402. Each of the DRAM banks 402 is coupled via a data bus dwx bits in width to a first port of a bidirectional multiplexer/demultiplexer (mux) 404. A second port of each of the multiplexer/demultiplexers 404 is coupled via a data bus of width dwy bits to an interconnection network 406. The interconnection network 406 is coupled to an inactive register bank 408. The DRAM banks 402 receive row addresses and activation and deactivation commands over a set of lines 410, preferably driven by the row registers 302 and the activation bits 304. The multiplexer/demultiplexers 404 receives a column control selection input 412, preferably from an output of the CAAU 308 of the data assembly unit 122. The interconnection network 406 receives a mask control input 414, preferably from the mask control/switch output 334 of the data assembly unit 122. The inactive register file 408 receives a set of control signals 416 from the inter-register move unit 224 over lines 338 and 340.

The scroll-RAM 400 of the present invention is a memory assembly device used to extract data blocks from an image distributed across multiple DRAM arrays. The scroll-RAM 400 represents an example of the type of functionality that may be incorporated into the mask and switch unit 108 in various embodiments. The scroll-RAM 400 is intended for use in image encoding and decoding systems as well as in other image and video processing where images are processed in block. For example, in MPEG image encoding and decoding systems, 8×8 image blocks are processed using a discrete cosine transform (DCT) during encoding and via an inverse DCT (IDCT) during image decoding. Motion compensation involves the processing of groups of four such 8×8 image blocks in a 16×16 macroblock. A problem arises when an image is stored in a DRAM and such blocks must be extracted. In many cases, the desired rows of the 8×8 or 16×16 blocks reside on different rows of the DRAM. Thus, to extract an 8×8 block, eight row accesses may be needed. To extract a 16×16 macroblock, 16 row accesses may be needed. In a system involving a data assembly unit, it would be desirable to extract an 8×8 block in a very short time. The scroll-RAM 400 enables rapid extraction of image blocks for use with embedded-DRAM processors. As will be discussed below, the scroll-RAM 400 is also useful in DSP operations such as digital filtering.

In operation, rows of an image are interleaved and wrapped within the DRAM banks 402. For example, a first row of the image is assigned to the DRAM bank 1, the second row is assigned to the DRAM bank 2, and so on, up until the eighth row is assigned to the DRAM bank 8. At this point, the rows wrap, i.e., the ninth row is assigned to DRAM bank 1, and each consecutive row is assigned to the next consecutive DRAM bank until DRAM bank 8 is reached, and then the assignment wraps back to DRAM bank 1. The rows continue to be assigned in this fashion until all rows are assigned to a DRAM bank. This is the initial assumed image storage configuration for the exemplary use of the scroll-RAM 400 as a block extraction unit. If a larger scroll-RAM 400 is available, one row is assigned to each DRAM in a wrapped fashion. For example, if 16 DRAM banks are used, the rows are wrapped modulo 16. With data arranged in this fashion, either 16×16 macroblocks or 8×8 blocks can be selected for extraction. With the image stored in this manner, a block may be extracted in parallel. For example, to extract the upper-right 8×8 block from an image, all eight DRAM banks 404 receive the row address corresponding to the first stored image row as well as an activation/read signal on the lines 410. In response, the DRAM arrays 402 drive all dwx words of their data bus lines through their sense amplifiers through to the column multiplexers/demultiplexers 404. These multiplexers select an eight-element slice of the row to forward onto the dwy-word data bus output. In this case, dwy equals eight. Next the interconnection network functions to assemble the 8×8 block in a predetermined order and to forward this rearranged data to the inactive register file 408. For example, the 8×8 block may always be stored in row major order. This allows the functional units 128 to receive the data in an expected, preassembled format corresponding to a specified program object type. The assembly and presentation of data as fixed object structures facilitates efficient translation of high-level language programs and simplifies pointer manipulations normally associated with programming DSPs. If more DRAM banks are used, just the top eight are selected in this example to extract the upper 8×8 block.

In this embodiment the multiplexers 404 perform the switching operations in an embodiment of the mask and switch unit 108. The interconnection network can provide additional switching capabilities. For example, when the 8×8 block is properly aligned with a row boundary the interconnection network does not need to perform any work. This type of alignment will be maintained as blocks of data are scanned out of a compressed image for IDCT processing. However, during motion compensation, it becomes desirable to extract blocks that are not properly aligned on eight-row boundaries. For example, in some cases it may be desirable to extract an 8×8 block whose first row corresponds to the second row of the image. In this case, due to the wrapped manner in which the image is stored, the second row of the image will appear at the input to the second multiplexer 404. Likewise, all subsequent multiplexers will receive subsequent image rows, except the first multiplexer which will receive the ninth, wrapped row of the image. At this point the interconnection network desirably acts as a barrel-rotator so that the 8×8 block can be restored to row-major order in a single cycle. In some embodiments, to save hardware, the rearrangement function can be performed within the inactive register file 408 under control of the inter-register data move unit 224 over lines 416. This second approach is slower, but may be the best solution. In the case of image decoding, the functional units need to compute a full IDCT on a previous block, leaving time for the data to be rearranged, while at the same time, the next set of needed rows in the DRAM banks 402 may be precharged. If the rearrangement occurs under control of the inter-register move unit 224, then the interconnection network 406 reduces to a set of wires. In connection with FIG. 1, the scroll-RAM 400 may be implemented as a subset of the mask and switch unit 108 on a subset of the DRAM arrays 102.

The scroll-RAM 400 may also be used when the program requires columns of data to be extracted from an image or matrix stored in the interleaved row-major order discussed above. To extract a column from the exemplary scroll-RAM 400, eight elements may be extracted during each DRAM access. The multiplexers 404 are sent control signals to pass the desired column, and the mask unit is controlled to only forward the desired column from the collection of eight columns presented. Next the interconnection network is sent a control signal to barrel-rotate each extracted column into the position that insures the final column is left in the register file in column major order. In this example, M data elements of a column can be loaded into a register file in M/8 DRAM access cycles. The barrel-rotator and rearrangement functions also allow the column to be shifted by variable amounts to accelerate filtering operations.

Figure 5:
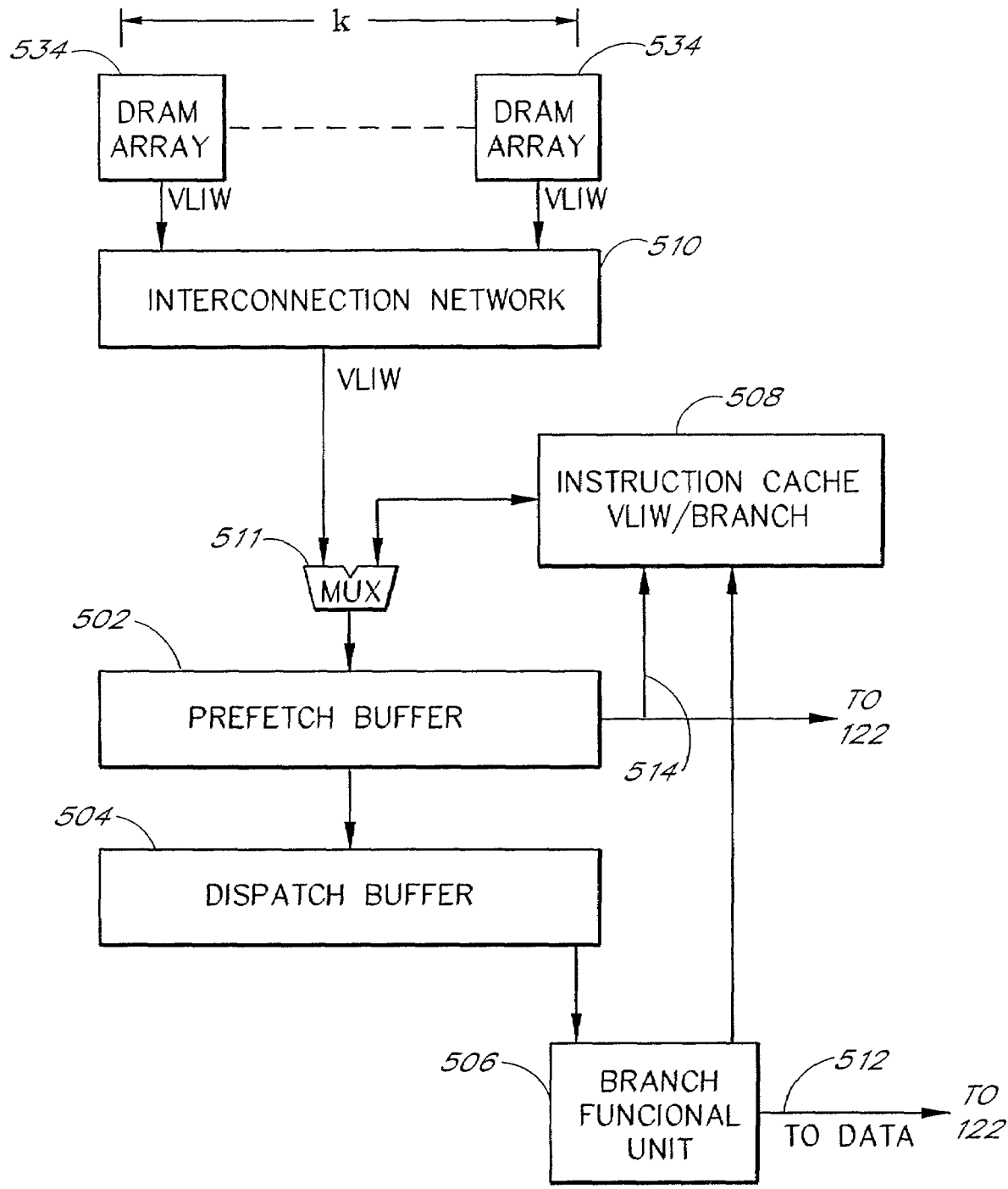
FIG. 5 is a block diagram that illustrates instruction prefetching from an interleaved DRAM bank assisted by a branch-oriented instruction cache.

FIG. 5 illustrates an embodiment of a system which generates a main instruction stream by fetching instructions directly from an interleaved DRAM bank. A branch-oriented instruction cache is provided to allow prefetching to proceed at full speed, even when access interleaving fails due to branching. This structure minimizes the amount of high-speed instruction cache that is needed by the system. A set of program memory DRAM arrays 534 are arranged for interleaved access. Each DRAM row preferably contains a VLIW (very long instruction word) instruction fetch packet, or at least a packet of instructions to be dispatched to the functional units 128 and optionally to the to the data assembly unit 122. The DRAM arrays 534 are preferably arranged in a rectangular grid. The number of rows in each of the DRAM arrays 534 is selected to provide the desired amount of program memory locations. The number of columns in each of the DRAM arrays 534 is preferably matched to the size of the instruction fetch packet used by the system. The outputs of the DRAM arrays 534 are coupled to an interconnection network 510, which may be a simple bus with an interleaved access controller. The output of the interconnection network 510 is coupled to a prefetch buffer 502 via a multiplexer (MUX) 511. The prefetch buffer output is coupled to a dispatch unit 504. Information may be fed from the prefetch unit 502 over a line 512 to a branch-oriented instruction cache 508. The branch-oriented instruction cache 508 also is coupled (via the multiplexer 511) to insert or extract fetch packets into or from the instruction stream that passes from the interconnection network 510 to the prefetch buffer 502. The prefetch buffer may send early indication information as well as a branch instruction tag on a line 514 to give the branch cache time to evaluate branch instruction tags. The line 514 may also send indication of the branch instruction to the data assembly unit 122 to warn of an upcoming branch condition. The dispatch unit's output is coupled to all functional units 128 and 122 (not shown) which receive instructions from the main instruction stream. One output of the dispatch unit sends branch instructions to a branch functional unit 506 capable of executing branch instructions. The branch functional unit 506 sends branch evaluation and target address data to a branch cache 508 and optionally to the data assembly unit 122 to indicate when a branch is evaluated to be taken.

As shown in FIG. 5, k DRAM banks 534 are arranged for interleaved sequential access. Each DRAM row size is matched to the VLIW instruction word size so that each DRAM access produces one complete VLIW instruction word. With this interleaved arrangement, k VLIW instructions can be accessed per DRAM access time. For example, if the processor cycle time is 5 nanoseconds and the DRAM access time is 30 nanoseconds, then setting k=6 allows one VLIW instruction to be fetched per processor cycle. This banking arrangement allows full speed execution during sequential processing, but the processor may need to wait when the sequential access sequence is broken. That is, when a branch is taken, the interleaving no longer allows full speed access and unless some form of caching is used, the processor will need to wait the full 30 nanoseconds for the DRAM.

The cache 508 is a special type of instruction cache that caches k consecutive VLIW instruction words when a branch is taken. The cache organization will be discussed in connection with FIG. 6. The VLIW fetch packets are loaded into the cache in parallel when they are loaded into the prefetch register after the cache miss occurs. The next time the branch is executed, a cache hit will occur, and the words will be supplied from the cache 508 instead of from the DRAM array 534. With this solution, the cache only needs to cache instructions immediately after a branch. Instead of the cache 508 needing to cache all the most recently used program code, the cache only needs to hold instruction sequences that occur immediately after recently used branch instructions. The architecture uses the interleaved banks of the DRAM 534 to allow fast access, uses very wide data paths to fetch groups of instructions at a time, and uses a minimum amount of SRAM to hide the latency of the DRAM, keeping with the objectives of the invention.

Figure 6:
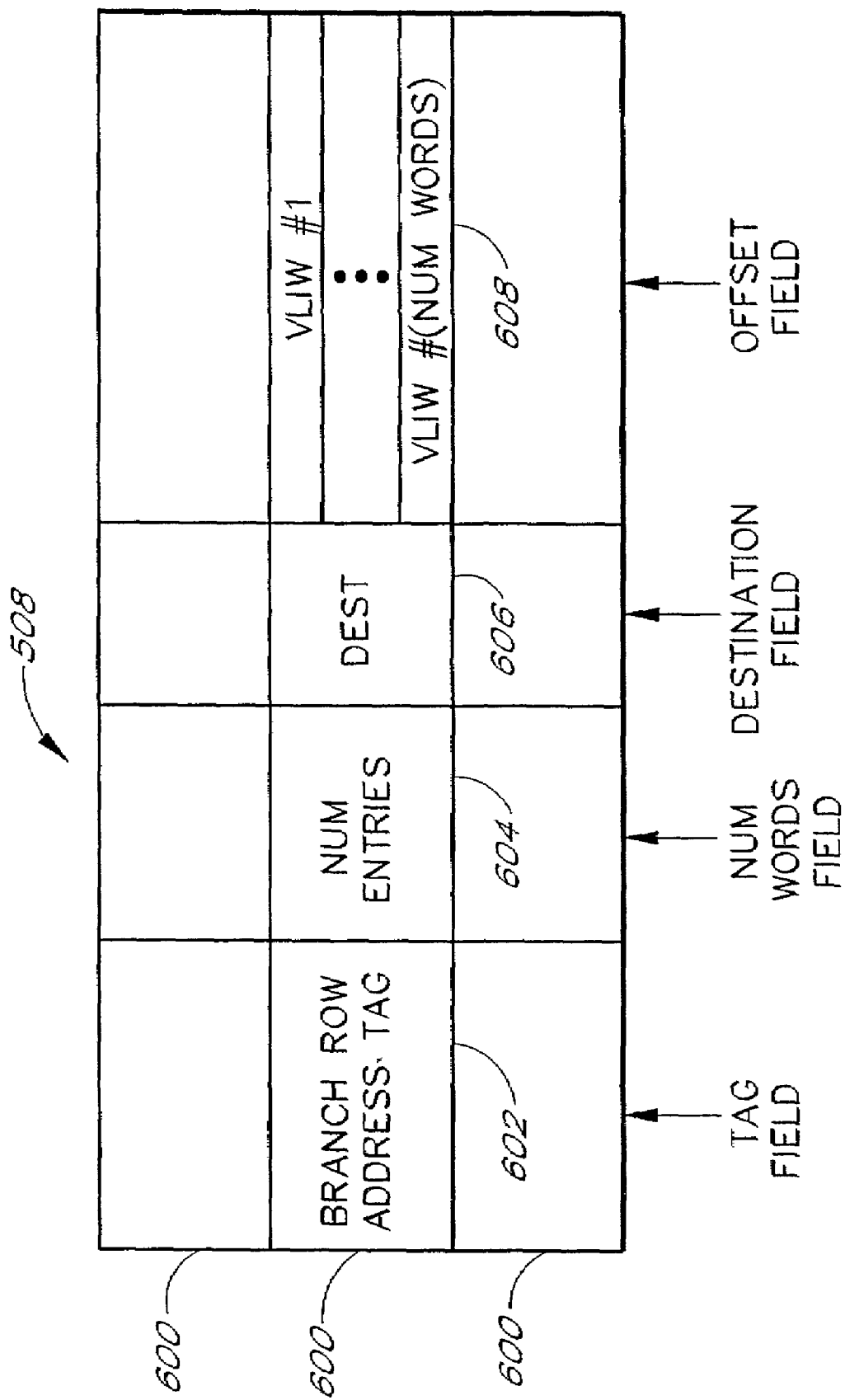
FIG. 6 is a block diagram that illustrates one embodiment of a branch-oriented instruction cache structure that accelerates program fetching from an interleaved set of DRAM banks.

FIG. 6 shows an embodiment of the branch-oriented instruction cache 508. The cache 508 comprises a set of cache lines 600. Each cache line 600 includes a tag field 602, a number of entries field 604, an optional destination field 606, and a variable number of VLIW fetch packets 608. The num entries field 604 indicates how many VLIW fetch packets are associated with each cache tag. For example, less than k lines need to be cached if one of the instructions contains a branch to a previously stored cache line, as happens in tight looping situations. The cache miss service algorithm monitors the branch indicator lines, and, if a branch is taken while servicing the miss, only those fetch packets up to the point where the second branch occurred are cached. If the branch leads outside the cache, a second cache miss will occur and the process is repeated. Less than k fetch packets are also needed when the cached fetch packets take multiple cycles to execute. For example, if the first fetch packet requires k cycles to dispatch, then only one fetch packet need be cached. The destination field 606 contains branch target address information.

The amount of branch cache needed can be farther reduced by employing rectangular program memory DRAMs having long rows which hold multiple fetch packets, where each fetch packet is multiplexed out in a burst mode using a column multiplexer. The technique uses the same concept used by prior art synchronous DRAMs to read out a stream of consecutive words in a burst mode.

Another method to reduce the amount of SRAM needed for program caching is to use branch look-ahead mixed with a speculative row precharge. In this technique, a bank of rectangular DRAMs is used with long rows holding multiple fetch packets. The DRAM arrays 534 operate in a clocked burst mode as is common on prior art synchronous DRAMs (SDRAMs). The sequencer reads one fetch packet per clock in the burst mode. In pipelined SDRAM embodiments, the clock is equal to the SDRAM's column access time. In latch-prefetch oriented SDRAM embodiments, a latch is used to buffer a plurality of fetch packets from a given row, so fetch packets may be read out in a burst mode using a clock which is faster than the column-access time of the DRAM array itself. Based on precompiled look-ahead information, when a branch is deemed to be in the present burst transfer, the prefetch unit speculatively precharges both the next sequential row with the fall-though address and the row containing the branch target address. This insures that the flow of instructions can continue in a burst mode uninterrupted. If the fall-through and the branch target instructions are in the same bank but on different rows, then the branch cache will miss if the target stream is executed. With this method, the branch cache only needs to be filled with the branch information related to instruction flows with the fall-through and the branch target addresses in the same DRAM array. When the branch target stream is subsequently executed, a branch cache hit is said to occur, and the instruction stream is read from the branch cache while the prefetcher precharges the appropriate row and resumes burst fetching. With this method, while multiple fetch packets are fetched per DRAM row, the branch cache lines include a variable number of fetch packets as previously described in connection with FIG. 6.

Another method to accelerate program fetching is to use deterministic branch caching. In this method, the branch cache control hardware is preset in advance. Since the cache is much smaller than normal, those branch target instruction sequences which create row conflicts and need caching are preloaded with the program. The branch cache uses look-ahead fetch addresses as tags to prepare the branch cache to supply instructions when speculative precharging cannot proceed. This way, no misses are suffered. When different program pages are loaded into memory, the cache may be modified accordingly using a prespecified load addresses. This method uses the concept of an intelligent cache, whereby a cache controller knowledgeable of the low level idiosyncrasies of the program from compile time is able to meet the caching needs without the common method of requiring very large caches based on hit and miss.

To implement intelligent caching in the instruction stream, the program is compiled or at least loaded with knowledge that it will be executed from a banked DRAM program memory. In a preferred embodiment, long rows of SDRAM-like memory holding multiple fetch packets which can each be read out in a single clock cycle in a burst mode are employed. The program is compiled, loaded, or compiled and loaded so that the fall-through address of a branch and the branch target addresses are in different banks. This allows a speculative precharge/read-initiation command to be issued to insure that both the fall-through and the branch target streams can be read out in an uninterrupted burst mode. To implement this, preferably at least three program memory DRAM banks are employed. This way two banks can be used to maintain a continuous SDRAM-style burst access, while branch targets may be handled with a separate bank. If needed, the DRAM and processor speeds can be matched by fetching two or more fetch packets per cycle into multiple SRAM prefetch buffers. Also, burst transfers which interleave accesses among multiple DRAM arrays may be used. The additional time created by fetch packets which take multiple cycles to dispatch will cause a memory pipeline stall, but reading of fetch packets may resume, one per clock, in response to a request to a next fetch packet prefetch request. This solution eliminates the need for a branch-oriented instruction cache, and thus, no SRAM is needed at all. In prefetch oriented SDRAM implementations, some SRAM is needed for the latch, but this may be shared with the prefetch buffer in some embodiments. That is, the long DRAM row is latched into a long prefetch buffer so that a multiplexer selects which section of the long latch is the current prefetch buffer to create a virtual burst-read effect. The ability to fetch programs from much larger banks of DRAM arrays using potentially much less silicon area than traditional SRAM based program cache approaches means that program sizes may increase without a significant use of resources. Also, program delays due to program cache-misses are effectively eliminated.

Although the present invention has been described with reference to a specific embodiment, other embodiments may occur to those skilled in the art without deviating from the intended scope. For example, in an alternate embodiment, to save hardware, less than entire rows could be multiplexed out of the DRAMs. In some embodiments, an inactive register file may be defined to be a visible architectural register file that is simply not being presently accessed by the set of functional units 128. In other embodiments, the data assembly unit may only contain a subset of the blocks shown in FIG. 3, and may contain additional blocks not shown in FIG. 3. Also, in FIG. 5, the branch oriented program cache could be coupled to the output side of the prefetch register or the dispatch register. The register files may be less than an entire row-width wide, or multiple cycles may need to be performed to load or store an entire register file. Numerous other arrangements may be designed by those skilled in the art without departing from the scope of the present invention. Therefore, it is to be understood that the invention herein encompasses all such embodiments which do not depart from the spirit and scope of the invention as defined in the appended claims.

What is claimed is:

1. For use in a system involving an Embedded-DRAM processor, a method for intelligent caching comprising the steps of:

splitting an architecture into first and second portions, said first portion comprising a set of functional units and a set of architectural registers exercised thereby, said second portion comprising at least one functional unit capable of moving data between a main memory implemented as one or more banks of DRAM without a caching system that employs cache hits and cache misses, and said set of architectural registers; and splitting a single program into first and second concurrently executing portions which each concurrently execute distinct subsets of parallely dispatched instructions from one or more instruction streams, said first portion of said program executed on said first portion of the architecture, said second portion of said program executed on said second portion of said architecture;

wherein said second portion of said architecture is operative to prefetch data from said main memory into said architectural registers prior to being processed by said first portion of said architecture, and wherein said second portion of said architecture is operative to move results produced by said first portion of said architecture into main memory after they are produced by said first portion of said architecture; and prior to when said first portion of said architecture executes a conditional branch instruction having a condition, said second portion of said architecture prefetches first and second data sets from memory into said architectural registers, said first data set being needed for use as instruction operands when said condition evaluates to true, said second data set being needed for use as instruction operands when said condition evaluates to false.

2. The method of claim 1, wherein speculative prefetching of data is performed from said main memory so that the first portion of said program need not wait for the first or the second data set to be fetched from said main memory, irrespective of the outcome of the conditional instruction.

3. The method of claim 1, wherein the second portion of said architecture generates a row precharge instruction to precharge a DRAM row of a bank of the one or more banks of DRAM to cause data to be ready prior to issuing a read command.

4. The method of claim 1, wherein the set of architectural registers comprises a register file comprising a plurality of registers and having a parallel access port operative to load or store, under control of the second portion of said program, contents of said register file in a single DRAM access cycle from or to a DRAM row of a bank of the one or more banks of DRAM.

5. The method of claim 4, wherein the load operation is performed with a mask to allow certain of the contents of selected registers of the register file not to be modified by the load operation.

6. The method of claim 4, wherein said register file further comprises at least a second access port operative to transfer data between one or more of the functional units of the first portion of said architecture.

7. The method of claim 4, wherein the first portion and the second portion of said architecture cooperate to execute a DRAM row selected by a row-address register, and said register file further comprises at least a second access port operative to transfer data between one or more of the functional units of the first portion of said architecture.

8. The method of claim 4, wherein the register file can be placed into an inactive state where the register file does not appear in a register space of the functional units of the first portion of said architecture.

9. The method of claim 4, wherein when the register file is placed into an inactive state, the second portion of the architecture is enabled to cause a parallel load or store operation to occur between the parallel access port and a row of DRAM in a bank of the one or more banks of DRAM.

10. The method of claim 1, wherein the first and second portions of said architecture cooperatively execute instructions to process image data for display.

11. The method of claim 1, wherein the first and second portions of said architecture cooperatively execute instructions to process video data for display.

12. The method of claim 1, wherein the first and second portions of said architecture cooperatively execute instructions to perform digital filtering operations.

13. The method of claim 1, wherein the first and second portions of said architecture cooperatively execute instructions to execute a video decoder algorithm.

14. For use in a system involving an Embedded-DRAM processor, a method for intelligent caching comprising:

providing an architecture split into first and second portions, said first portion comprising a set of functional units and a set of architectural registers exercised thereby, said second portion comprising at least one functional unit capable of moving data between a main memory implemented as one or more banks of DRAM, and said set of architectural registers, wherein the second portion accesses main memory without a caching system that employs cache hits and cache misses; and providing a single program split into first and second concurrently executing portions which each concurrently execute distinct subsets of parallely dispatched instructions from one or more instruction streams, said first portion of said program executed on said first portion of the architecture, said second portion of said program executed on said second portion of said architecture;

wherein said second portion of said architecture is operative to prefetch data from said main memory into one or more of said architectural registers prior to being processed by said first portion of said architecture, and wherein said second portion of said architecture is operative to move results produced by said first portion of said architecture into main memory after they are produced by said first portion of said architecture; and prior to when said first portion of said architecture executes a conditional branch instruction having a condition, said second portion of said architecture prefetches first and second data sets from said main memory into said architectural registers, said first data set being needed for use as instruction operands when said condition evaluates to true, said second data set being needed for use as instruction operands when said condition evaluates to false.

15. The method of claim 14, wherein speculative prefetching of data is performed from said main memory so that the first portion of said program need not wait for the first or the second data set to be fetched from said main memory, irrespective of the outcome of the conditional instruction.

16. The method of claim 14, wherein the second portion of said architecture generates a row precharge instruction to precharge a DRAM row of a bank of the one or more banks of DRAM to cause data to be ready prior to issuing a read command.

17. The method of claim 14, wherein the set of architectural registers comprises a register file comprising a plurality of registers and having a parallel access port operative to load or store, under control of the second portion of said program, contents of said register file in a single DRAM access cycle from or to a DRAM row of a bank of the one or more banks of DRAM.

18. The method of claim 17, wherein the load operation is performed with a mask to allow certain of the contents of selected registers of the register file not to be modified by the load operation.

19. The method of claim 17, wherein said register file further comprises at least a second access port operative to transfer data between one or more of the functional units of the first portion of said architecture.

20. The method of claim 17, wherein the first portion and the second portion of said architecture cooperate to execute a DRAM row selected by a row-address register, and said register file further comprises at least a second access port operative to transfer data between one or more of the functional units of the first portion of said architecture.

21. The method of claim 17, wherein the register file can be placed into an inactive state where the register file does not appear in a register space of the functional units of the first portion.

22. The method of claim 17, wherein when the register file is placed into an inactive state, the second portion of said architecture is enabled to cause a parallel load or store operation to occur between the parallel access port and a row of DRAM in a bank of the one or more banks of DRAM.

23. The method of claim 14, wherein the first and second portions of said architecture cooperatively execute instructions to process at least one of image data and video data, for display.

24. The method of claim 14, wherein the first and second portions of said program cooperatively execute instructions to perform digital filtering operations.

25. The method of claim 14, wherein when the first and second portions of said architecture cooperatively execute instructions to execute a video decoder algorithm.

26. In an embedded-DRAM processor, a method for intelligent caching, comprising:
providing an architecture comprising first and second portions, said first portion comprising a set of functional units and a set of architectural registers exercised thereby, said second portion comprising at least one functional unit capable of moving data between a main memory implemented substantially as one or more banks of DRAM, and said set of architectural registers, wherein the second portion accesses main memory without a caching system that employs cache hits and cache misses; and
providing a program comprising first and second program portions which each concurrently execute subsets of parallely dispatched instructions from one or more instruction streams, said first program portion executed on said first portion of the architecture, said second program portion executed on said second portion of said architecture;
wherein said second portion of said architecture is operative to prefetch data from said main memory into one or more of said architectural registers prior to being processed by said first portion of said architecture, and wherein said second portion of said architecture is operative to move results produced by said first portion of said architecture into main memory after they are produced by said first portion of said architecture; and
prior to when said first portion of said architecture executes a conditional instruction having a condition, said second portion of said architecture prefetches first and second data sets from said main memory into said architectural registers, said first data set being needed for use as instruction operands when said condition is true, said second data set being needed for use as instruction operands when said condition is false.

27. The method of claim 26, wherein speculative prefetching of data is performed from said main memory so that the first program portion need not wait for the first or the second data set to be fetched from said main memory, irrespective of the outcome of the conditional instruction.

28. The method of claim 26, wherein the second portion generates a row precharge instruction to precharge a DRAM row of a bank of the one or more banks of DRAM to cause data to be ready prior to issuing a read command.

29. The method of claim 26, wherein the set of architectural registers comprises a register file comprising a plurality of registers and having a parallel access port operative to load or store, under control of the second portion, contents of said register file in a single DRAM access cycle from or to a DRAM row of a bank of the one or more banks of DRAM.

30. The method of claim 29, wherein the load operation is performed with a mask to allow certain of the contents of selected registers of the register file not to be modified by the load operation.

31. The method of claim 29, wherein said register file further comprises at least a second access port operative to transfer data between one or more of the functional units of the first portion.

32. The method of claim 29, wherein the first portion and the second portion of said architecture cooperate to execute a DRAM row selected by a row-address register, and said register file further comprises at least a second access port operative to transfer data between one or more of the functional units of the first portion.

33. The method of claim 29, wherein the register file can be placed into an inactive state where the register file does not appear in a register space of the functional units of the first portion.

34. The method of claim 29, wherein when the register file is placed into an inactive state, the second portion is enabled to cause a parallel load or store operation to occur between the parallel access port and a row of DRAM in a bank of the one or more banks of DRAM.

35. The method of claim 26, wherein the first and second portions of said architecture cooperatively execute instructions to process at least one of image data or video data for display.

36. The method of claim 26, wherein the first and second portions of said architecture cooperatively execute instructions to perform digital filtering operations.

37. The method of claim 26, wherein when the first and second portions of said architecture cooperatively execute instructions to execute a video decoder algorithm.

38. In an Embedded-RAM processing apparatus, a method for intelligent caching comprising:

utilizing an architecture comprising first and second portions, said first portion comprising a set of functional units and a set of architectural registers exercised thereby, said second portion comprising at least one functional unit capable of moving data between a main memory implemented as one or more banks of RAM, and said set of architectural registers, wherein the second portion accesses main memory without a caching system that employs cache hits and cache misses; and utilizing a single program having first and second concurrently executing portions to each concurrently execute distinct subsets of parallelly dispatched instructions from one or more instruction streams, said first portion of said program executed on said first portion of the architecture, said second portion of said program executed on said second portion of said architecture;

wherein said second portion of said architecture is operative to fetch data in said main memory prior to being loaded into said first portion of said architecture, and wherein said second portion of said architecture is operative to move results produced by said first portion of said architecture into main memory after they are produced by said first portion of said architecture; and prior to when said first portion of said architecture executes a conditional instruction having a condition, said second portion of said architecture precharges first and second data sets in respective RAM rows, said first data set being needed for use as instruction operands when said condition is true, said second data set being needed for use as instruction operands when said condition is false.

39. The method of claim 38, wherein the second portion of said architecture generates a row precharge instruction to precharge a RAM row of a bank of the one or more banks of RAM to cause data to be ready prior to issuing a read command.

40. The method of claim 38, wherein the set of architectural registers comprises a register file comprising a plurality of registers and having a parallel access port operative to load or store, under control of the second portion of said program, contents of said register file in a single RAM access cycle from or to a RAM row of a bank of the one or more banks of RAM.

41. The method of claim 40, wherein at least one load operation is performed with a mask to allow certain of the contents of selected registers of the register file not to be modified by the at least one load operation.

42. The method of claim 40, wherein said register file further comprises at least a second access port operative to transfer data between one or more of the functional units of the first portion.

43. The method of claim 40, wherein the first portion and the second portion of said architecture cooperate to execute a RAM row selected by a row-address register, and said register file further comprises at least a second access port operative to transfer data between one or more of the functional units of the first portion.

44. The method of claim 40, wherein the register file can be placed into an inactive state where the register file does not appear in a register space of the functional units of the first portion.

45. The method of claim 40, wherein when the register file is placed into an inactive state, the second portion of said architecture is enabled to cause a parallel load or store operation to occur between the parallel access port and a row of RAM in a bank of the one or more banks of RAM.

46. The method of claim 38, wherein the first and second portions of said architecture cooperatively execute instructions to process at least one of image data or video data for display.

47. The method of claim 38, wherein the first and second portions of said architecture cooperatively execute instructions to perform digital filtering operations.

48. The method of claim 38, wherein when the first and second portions of said architecture cooperatively execute instructions to execute a video decoder algorithm.

49. The method of claim 38, wherein said RAM comprises scroll-RAM.

50. The method of claim 38, wherein said RAM comprises synchronous DRAM (SDRAM).

51. In an Embedded-RAM processing apparatus, a method for intelligent caching comprising:

providing an architecture comprising first and second portions, said first portion comprising a set of functional units and a set of architectural registers exercised thereby, said second portion comprising at least one functional unit capable of moving data between a main memory implemented as one or more banks of RAM, and said set of architectural registers, wherein the second portion accesses main memory without a caching system that employs cache hits and cache misses; and utilizing a program comprising first and second program portions to each concurrently execute distinct subsets of parallelly dispatched instructions from one or more instruction streams, said first program portion executed on said first portion of the architecture, said second program portion executed on said second portion of said architecture;

wherein said second portion of said architecture is operative to prefetch data from said main memory and to pass it into one or more of said architectural registers prior to being processed by said first portion of said architecture, and wherein said second portion of said architecture is operative to move results produced by said first portion of said architecture into main memory after they are produced by said first portion of said architecture; and prior to when said first portion of said architecture executes a conditional instruction having a condition, said second portion of said architecture prefetches first and second data sets from said main memory into said architectural registers, said first data set being needed for use as instruction operands when said condition is true, said second data set being needed for use as instruction operands when said condition is false.

52. The method of claim 51, wherein the second portion of said architecture generates a row precharge instruction to precharge a RAM row of a bank of the one or more banks of RAM to cause data to be ready prior to issuing a read command.

53. The method of claim 51, wherein the set of architectural registers comprises a register file comprising a plurality of registers and having a parallel access port operative to load or store, under control of the second portion, contents of said register file in a single RAM access cycle from or to a RAM row of a bank of the one or more banks of RAM.

54. The method of claim 53, wherein at least one load operation is performed with a mask to allow certain of the contents of selected registers of the register file not to be modified by the at least one load operation.

55. The method of claim 53, wherein said register file further comprises at least a second access port operative to transfer data between one or more of the functional units of the first portion.

56. The method of claim 53, wherein the first portion and the second portion of said architecture cooperate to execute a RAM row selected by a row-address register, and said register file further comprises at least a second access port operative to transfer data between one or more of the functional units of the first portion.

57. The method of claim 53, wherein the register file can be placed into an inactive state where the register file does not appear in a register space of the functional units of the first portion.

58. The method of claim 53, wherein when the register file is placed into an inactive state, the second portion is enabled to cause a parallel load or store operation to occur between the parallel access port and a row of RAM in a bank of the one or more banks of RAM.

59. The method of claim 51, wherein the first and second portions of said architecture cooperatively execute instructions to process at least one of image data or video data for display.

60. The method of claim 51, wherein the first and second portions of said architecture cooperatively execute instructions to perform digital filtering operations.

61. The method of claim 51, wherein when the first and second portions of said architecture cooperatively execute instructions to execute a video decoder algorithm.

62. The method of claim 51, wherein said RAM comprises scroll-RAM.

63. The method of claim 51, wherein said RAM comprises synchronous DRAM (SDRAM).

64. In an Embedded-DRAM processor, a method for caching comprising:
providing an architecture comprising first and second portions, said first portion comprising a set of functional units and a set of architectural registers exercised thereby, said second portion comprising at least one functional unit capable of moving data between a main memory implemented as one or more banks of DRAM, and said set of architectural registers, the second portion being capable of accessing main memory without a caching system that employs cache hits or cache misses; and
utilizing a program comprising first and second program portions which each concurrently execute distinct subsets of parallely dispatched instructions from one or more instruction streams, said first program portion executed on said first portion of the architecture, said second program portion executed on said second portion of said architecture;
wherein said second portion of said architecture is operative to prefetch data from said main memory and to pass it to one or more of said registers prior to being processed by said first portion of said architecture, and wherein said second portion of said architecture is operative to move results produced by said first portion of said architecture to frame buffer memory after they are produced by said first portion of said architecture; and
prior to when said first portion of said architecture executes a conditional instruction having a condition, said second portion of said architecture prefetches first and second data sets from main memory into said registers, said first data set being needed for use as instruction operands when said condition is true, said second data set being needed for use as instruction operands when said condition is false.

65. The method of claim 64, wherein the second portion of said architecture generates a row precharge instruction to precharge a DRAM row of a bank of the one or more banks of DRAM to cause data to be ready prior to issuing a read command.

66. The method of claim 64, wherein the set of architectural registers comprises a register file comprising a plurality of registers and having a parallel access port operative to load or store, under control of the second portion of said program, contents of said register file in a single DRAM access cycle from or to a DRAM row of a bank of the one or more banks of DRAM.

67. The method of claim 66, wherein at least one load operation is performed with a mask to allow certain of the contents of selected registers of the register file not to be modified by the at least one load operation.

68. The method of claim 66, wherein said register file further comprises at least a second access port operative to transfer data between one or more of the functional units of the first portion.

69. The method of claim 66, wherein the first portion and the second portion of said architecture cooperate to execute a RAM row selected by a row-address register, and said register file further comprises at least a second access port operative to transfer data between one or more of the functional units of the first portion.

70. The method of claim 66, wherein the register file can be placed into an inactive state where the register file does not appear in a register space of the functional units of the first portion.

71. The method of claim 66, wherein when the register file is placed into an inactive state, the second portion is enabled to cause a parallel load or store operation to occur between the parallel access port and a row of RAM in a bank of the one or more banks of RAM.

72. The method of claim 64, wherein the first and second portions of said architecture cooperatively execute instructions to process at least one of image data or video data for display.

73. The method of claim 64, wherein the first and second portions of said architecture cooperatively execute instructions to perform digital filtering operations.

74. The method of claim 64, wherein when the first and second portions of said architecture cooperatively execute instructions to execute a video decoder algorithm.

75. For use in a system involving an Embedded-DRAM processor, a method for caching comprising:
providing an architecture comprising first and second portions, said first portion comprising a set of functional units and a set of architectural registers exercised thereby, said second portion comprising at least one functional unit capable of moving data between a main memory implemented as one or more banks of DRAM, and said set of architectural registers, the second portion accessing main memory without a caching system that employs cache hits and cache misses; and providing a program comprising first and second program portions concurrently executing respective ones of distinct subsets of parallely dispatched instructions from one or more instruction streams, said first program portion executing on said first portion of the architecture, said second program portion executing on said second portion of said architecture;

wherein said second portion of said architecture is operative to prefetch data from said main memory and to pass it into one or more of said architectural registers prior to processing by said first portion of said architecture, and wherein said second portion of said architecture is operative to move results produced by said first portion of said architecture into a frame buffer memory after they are produced by said first portion of said architecture; and prior to when said first portion of said architecture executes an instruction, said second portion of said architecture prefetching first and second data sets from main memory into said architectural registers, said first and second data sets being needed for use as instruction operands.

76. The method of claim 75, wherein the second portion of said architecture generates a row precharge instruction to precharge a DRAM row of a bank of the one or more banks of DRAM to cause data to be ready prior to issuing a read command.

77. The method of claim 75, wherein the set of architectural registers comprises a register file comprising a plurality of registers and having a parallel access port operative to load or store, under control of the second portion, contents of said register file in a single DRAM access cycle from or to a DRAM row of a bank of the one or more banks of DRAM.

78. The method of claim 77, wherein at least one load operation is performed with a mask to allow certain of the contents of selected registers of the register file not to be modified by the at least one load operation.

79. The method of claim 77, wherein said register file further comprises at least a second access port operative to transfer data between one or more of the functional units of the first portion.

80. The method of claim 77, wherein said register file further comprises at least a second access port operative to transfer data between one or more of the functional units of the first portion of said architecture.

81. The method of claim 77, wherein the register file can be placed into an inactive state where the register file does not appear in a register space of the functional units of the first portion.

82. The method of claim 77, wherein when the register file is placed into an inactive state, the second portion is enabled to cause a parallel load or store operation to occur between the parallel access port and a row of RAM in a bank of the one or more banks of RAM.

83. The method of claim 75, wherein the first and second portions of said architecture cooperatively execute instructions to process at least one of image data or video data for display.

84. The method of claim 75, wherein the first and second portions of said architecture cooperatively execute instructions to perform digital filtering operations.

85. The method of claim 75, wherein when the first and second portions of said architecture cooperatively execute instructions to execute a video decoder algorithm.

86. For use in a system involving an Embedded-DRAM processor, said system comprising (i) an architecture comprising first and second portions, said first portion comprising a set of functional units and a set of architectural registers exercised thereby, said second portion comprising at least one functional unit capable of moving data between a main memory implemented as one or more banks of DRAM, and said set of architectural registers, wherein the second portion accesses main memory without a caching system that employs cache hits and cache misses, and (ii) a program comprising first and second program portions which each concurrently execute distinct subsets of parallely dispatched instructions from one or more instruction streams, said first program portion executed on said first portion of the architecture, said second program portion executed on said second portion of said architecture, a method for intelligent caching comprising:

prefetching, using at least said second portion of said architecture, data from said main memory into one or more of said architectural registers prior to being processed by said first portion of said architecture, and wherein said second portion of said architecture is operative to move results produced by said first portion of said architecture into main memory after they are produced by said first portion of said architecture; and prefetching, using at least said second portion of said architecture and prior to when said first portion of said architecture executes a conditional branch instruction having a condition, first and second data sets from said main memory into said architectural registers, said first data set being needed for use as instruction operands when said condition is true, said second data set being needed for use as instruction operands when said condition is false.

87. For use in a system involving an Embedded-RAM processor, said system comprising (i) an architecture comprising first and second portions, said first portion comprising a set of functional units and a set of architectural registers exercised thereby, said second portion comprising at least one functional unit capable of moving data between a main memory implemented as one or more banks of RAM, and said set of architectural registers, wherein the second portion accesses main memory without a caching system that employs cache hits and cache misses, and (ii) a program comprising first and second program portions which each concurrently execute distinct subsets of parallely dispatched instructions from one or more instruction streams, said first program portion executed on said first portion of the architecture, said second program portion executed on said second portion of said architecture, a method for intelligent caching comprising:

fetching, using at least said second portion of said architecture, data in said main memory prior to being loaded into said first portion of said architecture, and wherein said second portion of said architecture is operative to move results produced by said first portion of said architecture into main memory after they are produced by said first portion of said architecture; and precharging, using at least said second portion of said architecture, and prior to when said first portion of said architecture executes a conditional instruction having a condition, first and second data sets in respective RAM rows, said first data set being needed for use as instruction operands when said condition is true, said second data set being needed for use as instruction operands when said condition is false.

88. In an Embedded-RAM processing apparatus comprising (i) an architecture comprising first and second portions, said first portion comprising a set of functional units and a set of architectural registers exercised thereby, said second portion comprising at least one functional unit capable of moving at least a portion of the contents of a main memory implemented as one or more banks of RAM to said set of architectural registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for intelligent caching comprising:

fetching, using at least said second portion of said architecture, data in said main memory prior to said data being passed to one or more of said architectural registers prior to said data being processed by said first portion of said architecture, and wherein said second portion of said architecture is operative to move results produced by said first portion of said architecture into said main memory after they are produced by said first portion of said architecture; and precharging, using at least said second portion of said architecture, and prior to when said first portion of said architecture executes a conditional instruction having a condition, from said main memory into said architectural registers, first and second data sets, said first data set being needed for use as instruction operands when said condition is true, said second data set being needed for use as instruction operands when said condition is false.

89. In an Embedded-DRAM processing apparatus comprising (i) an architecture split into first and second portions, said first portion comprising a set of functional units and a set of architectural registers exercised thereby, said second portion comprising at least one functional unit capable of moving at least a portion of the contents of a main memory implemented as one or more banks of DRAM to said set of architectural registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for intelligent caching comprising:

fetching, using at least said second portion of said architecture, data in said main memory prior to said data being passed to one or more of said architectural registers prior to said data being processed by said first portion of said architecture, and wherein said second portion of said architecture is operative to move results produced by said first portion of said architecture into a frame buffer memory after they are produced by said first portion of said architecture; and charging, using at least said second portion of said architecture, and prior to when said first portion of said architecture executes a conditional instruction, from said main memory into said architectural registers, first and second data sets, said first and second data sets being needed for use as instruction operands.

90. In an Embedded-DRAM processing apparatus comprising (i) an architecture comprising first and second portions, said first portion comprising a set of functional units and a set of architectural registers exercised thereby, said second portion comprising at least one functional unit capable of moving at least a portion of the contents of a main memory implemented as one or more banks of DRAM to said set of architectural registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for intelligent caching comprising:

fetching, using at least said second portion of said architecture, data in said main memory prior to said data being passed to one or more of said architectural registers prior to said data being processed by said first portion of said architecture, and wherein said second portion of said architecture is operative to move results produced by said first portion of said architecture into said main memory after they are produced by said first portion of said architecture; and charging, using at least said second portion of said architecture, and prior to when said first portion of said architecture executes a conditional instruction having a condition, in respective DRAM rows, first and second-data sets, said first data set being needed for use as instruction operands when said condition is true, said second data set being needed for use as instruction operands when said condition is false.

91. In an Embedded-DRAM processing apparatus comprising (i) an architecture comprising first and second portions, said first portion comprising a set of functional units and a set of architectural registers exercised thereby, said second portion comprising at least one functional unit capable of moving at least a portion of the contents of a main memory implemented as one or more banks of DRAM to said set of registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for intelligent caching comprising:

fetching, using at least said second portion of said architecture, data in said main memory prior to said data being passed to one or more of said registers prior to said data being processed by said first portion of said architecture, and wherein said second portion of said architecture is operative to move results produced by said first portion of said architecture into said main memory after they are produced by said first portion of said architecture; and prefetching, using at least said second portion of said architecture, and prior to when said first portion of said architecture executes a conditional instruction, in respective DRAM rows, first and second data sets into said registers, said first and second data sets being needed for use as operands.

92. For use in an Embedded-DRAM processing apparatus (i) first architecture means and second architecture means, said first means comprising a set of functional means and a set of architectural register means exercised thereby, said second architecture means comprising at least one functional means capable of moving at least a portion of the contents of one or more banks of means for storing data to said set of register means, wherein the second architectural means accesses said means for storing data without a caching system that employs cache hits and cache misses, and (ii) a program comprising first and second program portions which each concurrently execute distinct subsets of parallely dispatched instructions from one or more instruction streams, said first program portion executed on said first architecture means, said second program portion executed on said second architecture means, a method for caching comprising:

prefetching, using at least said second architecture means, data from said means for storing data into one or more of said register means prior to said data being processed by said first architecture means, and wherein said second architecture means is operative to move results produced by said first architecture means into said means for storing after they are produced by said first architecture means; and prefetching, using at least said second architecture means and prior to when said first architecture means executes a conditional instruction having a condition, first and second data sets from said means for storing into said register means, said first data set being needed for use as operands when said condition is true, said second data set being needed for use as operands when said condition is false.

93. In an Embedded-RAM processing apparatus comprising (i) an architecture comprising first and second portions, said first portion comprising a set of functional means and a set of registers exercised thereby, said second portion comprising at least one functional means capable of at least moving contents of a main memory implemented as one or more banks of RAM to said set of registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for caching comprising:

fetching, using at least said second portion of said architecture, data in said main memory prior to said data being passed to one or more of said registers prior to said data being processed by said first portion of said architecture, and wherein said second portion of said architecture is operative to move results produced by said first portion of said architecture into said main memory after they are produced by said first portion of said architecture; and precharging first and second data sets into said registers, using at least said second portion of said architecture, and prior to when said first portion of said architecture executes a conditional instruction having a condition, said first data set being needed for use as operands when said condition is true, said second data set being needed for use as operands when said condition is false.

94. In an Embedded-RAM processing apparatus comprising (i) an architecture comprising first and second portions, said first portion comprising a set of functional means and a set of registers exercised thereby, said second portion comprising at least one functional means capable of at least moving contents of a main memory implemented as one or more banks of RAM to said set of registers, wherein the second portion accesses main memory without a caching system that employs cache hits and cache misses, and (ii) a program comprising first and second program portions which concurrently execute distinct subsets of parallely dispatched instructions from one or more instruction streams, said first program portion executed on said first portion of the architecture, said second program portion executed on said second portion of said architecture, a method for caching comprising:

fetching, using at least said second portion of said architecture, data in said main memory prior to said data being passed to one or more of said registers prior to said data being processed by said first portion of said architecture, and wherein said second portion of said architecture is operative to move results produced by said first portion of said architecture into a frame buffer after they are produced by said first portion of said architecture; and charging first and second data sets into said registers, using at least said second portion of said architecture, and prior to when said first portion of said architecture executes a conditional instruction, said first and second data sets being needed for use as operands.

* * * * *